United States Patent
Cramer et al.

(10) Patent No.: US 8,992,715 B2
(45) Date of Patent: *Mar. 31, 2015

(54) SYSTEM AND METHOD FOR THE RAPID, AUTOMATED CREATION OF ADVANCED COMPOSITE TAILORED BLANKS

(71) Applicant: Dieffenbacher GMBH Maschinen- und Anlagenbau, Eppingen (DE)

(72) Inventors: David R. Cramer, Basalt, CO (US); Neal J. Beidleman, Aspen, CO (US); Colin R. Chapman, Carbondale, CO (US); Don O. Evans, New Castle, CO (US); Michael K. Passmore, Glenwood Springs, CO (US); Michael L. Skinner, Draper, UT (US)

(73) Assignee: Dieffenbacher GmbH Maschinen-und Anlagenbau, Eppingen (DE)

( * ) Notice: Subject to any disclaimer, the term of this patent is extended or adjusted under 35 U.S.C. 154(b) by 12 days.

This patent is subject to a terminal disclaimer.

(21) Appl. No.: 13/851,242

(22) Filed: Mar. 27, 2013

(65) Prior Publication Data

US 2013/0276954 A1 Oct. 24, 2013

Related U.S. Application Data

(60) Continuation of application No. 13/435,006, filed on Mar. 30, 2012, now Pat. No. 8,414,729, which is a continuation of application No. 13/251,360, filed on Oct. 3, 2011, now Pat. No. 8,168,029, which is a division of application No. 12/237,077, filed on Sep. 24, 2008, now Pat. No. 8,048,253.

(60) Provisional application No. 60/975,464, filed on Sep. 26, 2007.

(51) Int. Cl.
| | | |
|---|---|---|
| B31B 1/60 | (2006.01) | |
| B29C 65/00 | (2006.01) | |
| B32B 37/00 | (2006.01) | |
| B32B 38/04 | (2006.01) | |
| H05K 13/04 | (2006.01) | |
| E04F 13/08 | (2006.01) | |
| B32B 37/02 | (2006.01) | |
| B29C 70/38 | (2006.01) | |
| B29C 65/08 | (2006.01) | |
| B29C 65/78 | (2006.01) | |
| B29C 70/08 | (2006.01) | |
| B29K 101/10 | (2006.01) | |
| B29K 101/12 | (2006.01) | |
| B29K 105/08 | (2006.01) | |
| B29K 105/12 | (2006.01) | |

(52) U.S. Cl.
CPC .............. *B32B 37/02* (2013.01); *B29C 70/386* (2013.01); *B29C 65/08* (2013.01); *B29C 65/7841* (2013.01); *B29C 66/1122* (2013.01); *B29C 66/21* (2013.01); *B29C 66/43* (2013.01); *B29C 66/721* (2013.01); *B29C 70/086* (2013.01); *B29K 2101/10* (2013.01); *B29K 2101/12* (2013.01); *B29K 2105/08* (2013.01); *B29K 2105/12* (2013.01)

USPC ................. 156/265; 156/1; 156/60; 156/250; 156/256; 156/264; 156/297; 156/298; 156/299; 156/302; 156/303; 156/300; 156/301; 156/290; 156/285; 156/286

(58) Field of Classification Search
USPC .............. 156/1, 60, 250, 256, 264, 265, 297, 156/298, 299, 302, 303, 300, 301, 290, 285, 156/286
See application file for complete search history.

(56) References Cited

U.S. PATENT DOCUMENTS

| | | |
|---|---|---|
| 3,808,040 A | 4/1974 | Barnes et al. |
| 4,028,158 A | 6/1977 | Hipchen et al. |
| 4,092,453 A | 5/1978 | Jonda |
| 4,556,440 A | 12/1985 | Krueger |
| 4,567,738 A | 2/1986 | Hutson et al. |
| 4,600,456 A | 7/1986 | Oswald |
| 4,848,066 A | 7/1989 | Luhman |
| 5,269,863 A | 12/1993 | Middelman |
| 5,308,424 A | 5/1994 | Sasaki et al. |
| 5,368,913 A | 11/1994 | Ortega |
| 5,445,693 A | 8/1995 | Vane |
| 6,575,218 B1 * | 6/2003 | Burns et al. .................... 156/512 |

(Continued)

FOREIGN PATENT DOCUMENTS

| | | |
|---|---|---|
| CN | ZL200880108792.7 | 3/2013 |
| JP | 482902 | 1/1973 |

(Continued)

OTHER PUBLICATIONS

International Search Report and Written Opinion dated Mar. 23, 2009 in International Application No. PCT/US2008/011231.
International Search Report dated Nov. 16, 2001 in International Application No. PCT/US2001/23757.
European Office Action dated Dec. 22, 2006 in European Application No. 01959289.8-2124.
Extended European Search Report dated Apr. 8, 2011 in European Application No. 10185499.0-2124.
Japanese Office Action mailed Dec. 15, 2009, from the Japanese Patent Office in Patent Application No. 2002-516088, and English translation thereof.

(Continued)

*Primary Examiner* — Richard Crispino
*Assistant Examiner* — Matthew Hoover
(74) *Attorney, Agent, or Firm* — Plumsea Law Group, LLC

(57) ABSTRACT

An embodiment of the present invention provides a method for manufacturing a composite preform from tape material, including feeding a tape section into a tape section guide that suspends the tape across a tooling surface, moving at least one of the tape section guide and the tooling surface relative to each other to position the tape section at a desired location and orientation relative to the tooling surface, moving the tape section toward a pre-existing tape section disposed on the tooling surface, and tacking the tape section to the pre-existing tape section. A corresponding apparatus for manufacturing composite preforms is also disclosed.

25 Claims, 24 Drawing Sheets

(56) References Cited

U.S. PATENT DOCUMENTS

| | | | |
|---|---|---|---|
| 6,607,626 | B2 | 8/2003 | Taggart |
| 6,939,423 | B2 | 9/2005 | Taggart |
| 7,008,495 | B2 | 3/2006 | Mancini |
| 7,094,310 | B2 | 8/2006 | Yamaguchi et al. |
| 7,235,149 | B2 | 6/2007 | Taggart |
| 8,007,894 | B2 | 8/2011 | Taggart |
| 8,048,253 | B2 * | 11/2011 | Cramer et al. ............ 156/265 |
| 8,168,029 | B2 | 5/2012 | Cramer et al. |
| 8,414,729 | B2 | 4/2013 | Cramer et al. |
| 2003/0104746 | A1 | 6/2003 | Menzies et al. |
| 2003/0209317 | A1 | 11/2003 | Koehler et al. |
| 2005/0178507 | A1 | 8/2005 | Hajny et al. |
| 2006/0048881 | A1 * | 3/2006 | Evans et al. ............... 156/64 |
| 2006/0249868 | A1 * | 11/2006 | Brown et al. ............ 264/163 |
| 2009/0101277 | A1 | 4/2009 | Cramer et al. |
| 2011/0152051 | A1 | 6/2011 | Murray |
| 2012/0018097 | A1 | 1/2012 | Cramer et al. |
| 2012/0186749 | A1 | 7/2012 | Cramer et al. |

FOREIGN PATENT DOCUMENTS

| | | |
|---|---|---|
| JP | 04-268342 | 9/1991 |
| JP | 07-214714 | 8/1995 |
| JP | 2003-136634 | 5/2003 |
| JP | 2004042277 | 2/2004 |
| JP | 2004218133 | 8/2004 |
| WO | 8504838 | 11/1985 |

OTHER PUBLICATIONS

International Preliminary Report on Patentability mailed Apr. 8, 2010 in PCT Application No. PCT/US2008/011231.
Office Action mailed Feb. 18, 2009 in U.S. Appl. No. 11/798,823.
Response to Office Action filed Mar. 18, 2009 in U.S. Appl. No. 11/798,823.
Office Action mailed Jul. 8, 2009 in U.S. Appl. No. 11/798,823.
Response to Office Action filed Nov. 9, 2009 in U.S. Appl. No. 11/798,823.
Final Office Action mailed Jan. 25, 2010 in U.S. Appl. No. 11/798,823.
Response to Final Office Action filed Apr. 26, 2010 in U.S. Appl. No. 11/798,823.
Office Action mailed May 27, 2010 in U.S. Appl. No. 11/798,823.
Response to Office Action filed Sep. 24, 2010 in U.S. Appl. No. 11/798,823.
Final Office Action mailed Dec. 22, 2010 in U.S. Appl. No. 11/798,823.
Response to Final Office Action filed Jan. 31, 2011 in U.S. Appl. No. 11/798,823.
Notice of Allowance dated Apr. 20, 2011 in U.S. Appl. No. 11/798,823.
International Search Report and Written Opinion dated Dec. 19, 2012 in International Application No. PCT/US2012/048252.
Japanese Office Action mailed Jan. 29, 2013, from the Japanese Patent Office in Japanese Patent Application No. 2010-526965, and English translation thereof.
English translation of Korean Office Action dated Aug. 2, 2013, from the Korean Patent Office in Korean Patent Application No. 2010-7007753.
Office Action mailed Aug. 19, 2014 in Japanese Patent Application No. 2013-183812, and English translation thereof.
Office Action mailed Nov. 5, 2014 in U.S. Appl. No. 13/557,621.

* cited by examiner

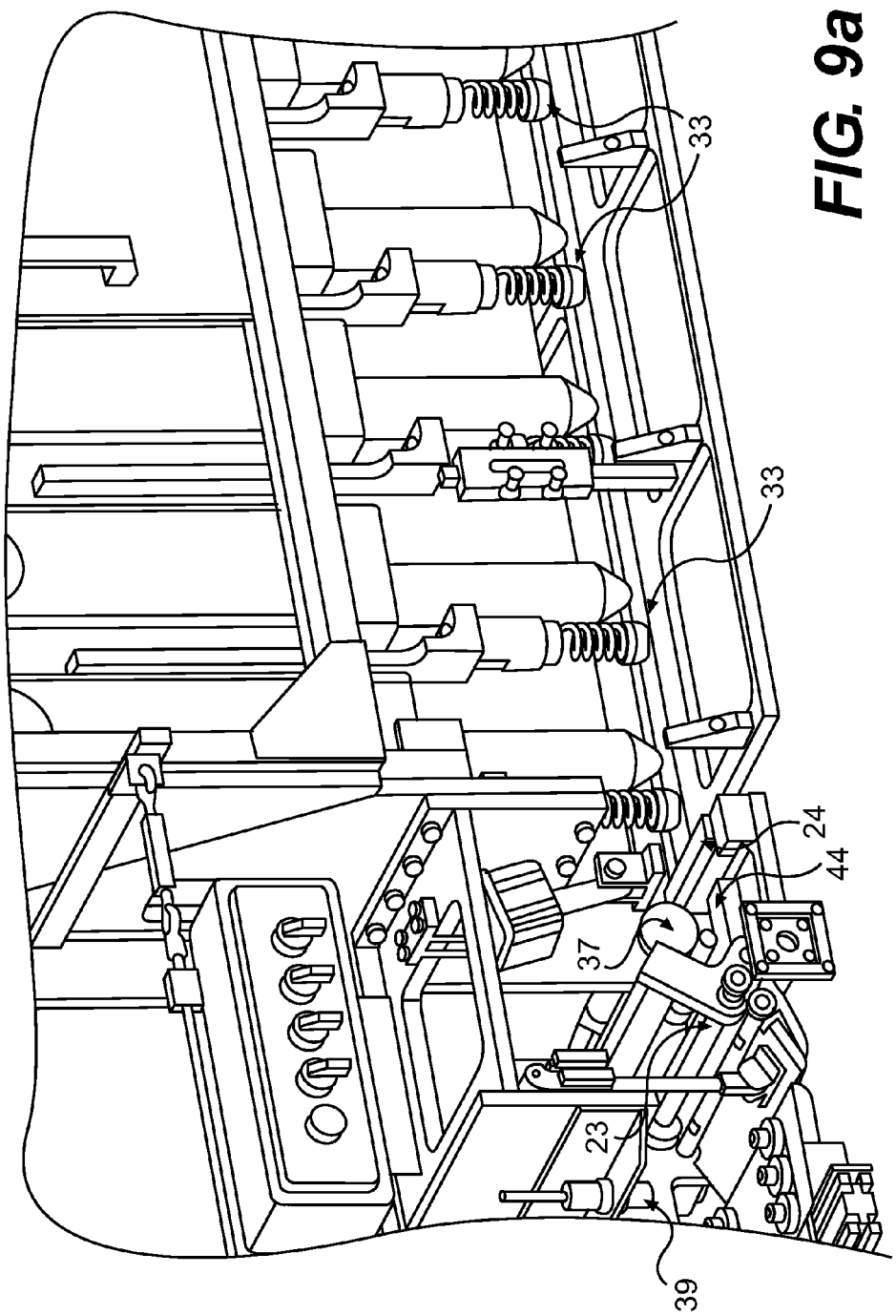

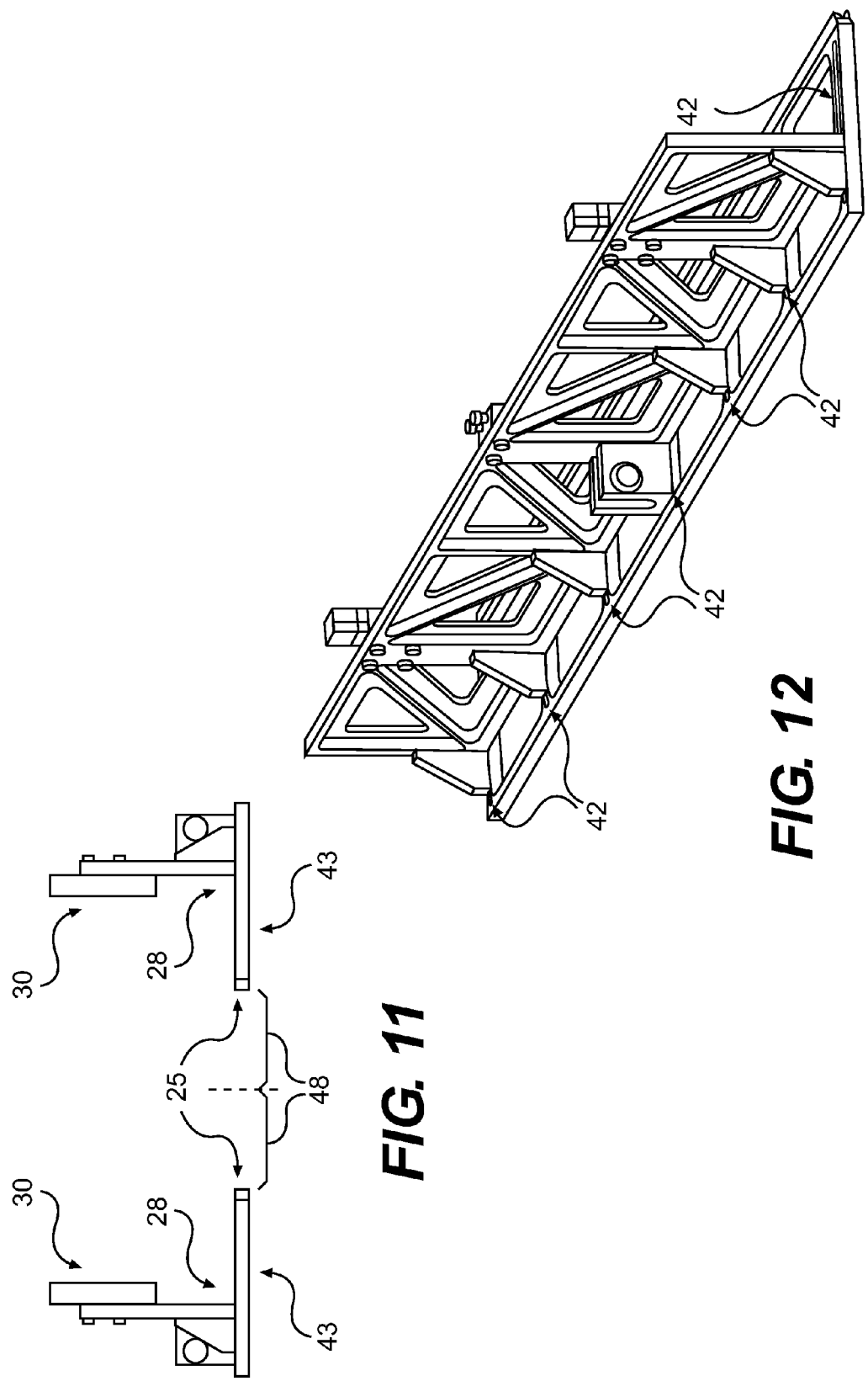

SYSTEM AND METHOD FOR THE RAPID, AUTOMATED CREATION OF ADVANCED COMPOSITE TAILORED BLANKS

This application is a continuation of U.S. application Ser. No. 13/435,006, filed Mar. 30, 2012, now U.S. Pat. No. 8,414,729, which is a continuation of U.S. application Ser. No. 13/251,360, filed Oct. 3, 2011, now U.S. Pat. No. 8,168,029, which is a division of U.S. application Ser. No. 12/237,077, filed Sep. 24, 2008, now U.S. Pat. No. 8,048,253, which claims the benefit of U.S. Provisional Application No. 60/975,464, filed Sep. 26, 2007, all of which are herein incorporated by reference in their entirety.

BACKGROUND

1. Field of the Invention

The present invention relates generally to advanced composites and, more particularly, to a system and method for rapidly fabricating advanced-composite laminates with low scrap using automated equipment.

2. Background of the Invention

Advanced composite materials are increasingly used in high-performance structural products that require low weight and high strength and/or stiffness. Composite materials are engineered materials that comprise two or more components. This patent relates to polymer composites that combine reinforcing fibers such as carbon fiber, glass fiber, or other reinforcing fibers with a thermosetting or thermoplastic polymer resin such as epoxy, nylon, polyester, polypropylene, or other resins. The fibers typically provide the stiffness and strength in the direction of the fiber length, and the resin provides shape and toughness and transfers load between and among the fibers. Structural performance of an advanced composite part increases with increased fiber-to-resin ratio (also called fiber volume fraction), increased fiber length, degree of fiber orientation to line up with a part's loads (in contrast to random fiber orientation), and the straightness of the fibers. Weight of an advanced-composite part can also be improved by selectively adding or subtracting material according to where it is highly and lightly stressed.

Typically, the manufacture of high-performance, advanced-composite parts is a slow and labor-intensive process. Thus, several approaches for automating the fabrication of advanced composite parts have been developed to reduce touch labor, decrease cycle time, and improve part quality and repeatability. Such machines are used to fabricate small and large parts ranging from entire plane fuselages to pressure vessels, pipes, blades for wind turbines, and wing skins. These machines typically place tape material directly on a mandrel or a mold using a material placement head mounted on a multi-axis numerically controlled machine. As the material is laid up, it is consolidated with any underlying layers. This is called "in situ" consolidation.

A different approach, described in U.S. Pat. Nos. 6,607,626 and 6,939,423, which are herein incorporated by reference, is to lay up a flat "tailored blank" where all the plies of the composite laminate are only tacked together. Once the tailored blank has been made, subsequent processing steps are used to consolidate the plies together and form the blank into its final shape.

One characteristic typical to tape and fiber placement machines is the overall technique used to apply material to a tooling surface: machines progressively unroll a tape or tow material onto a tooling surface and tack it in place using one or more compaction rollers or shoes as the material is fed onto the surface. While this technique yields high quality parts, one main limitation is that increasing material placement speed requires larger, higher power machines, which have a compounding effect on system size, energy consumption, cost, and precision. In many systems, speed is also constrained by heat transfer, especially for thermoplastic composites that are typically melted and then refrozen during placement.

BRIEF SUMMARY OF THE INVENTION

The present invention provides a system and method for applying composite tape material onto a tooling surface. Instead of progressively applying tape to a tooling surface, the present invention feeds tape material of a predetermined length and locates it above the tooling surface. The tape can be pre-cut into a tape section or can be fed from a tape supply and cut into a tape section (or course) of the desired length. The tape section is moved toward the tooling surface. Once near or on the tooling surface, the entire tape section can be tacked to the underlying material in one operation. The tacking can comprise, for example, the fusing of the tape section to the underlying material at isolated locations using a spot welder. Separating the tape feed operation from the tacking operation allows the system to run automatically, faster, and more reliably.

An embodiment of the present invention comprises a system and method for making high-performance, advanced-composite laminates by positioning one or more tape sections over a multi-axis motion table, then lowering the tape sections onto the table and tacking them to previously laid material using an array of spot welding units.

BRIEF DESCRIPTION OF THE DRAWINGS

FIGS. 9a and 9b are schematic diagrams illustrating a detail view of an exemplary tape placement head, according to an embodiment of the present invention.

FIG. 11 is a schematic diagram illustrating an end view of an exemplary carriage frame, according to an embodiment of the present invention.

FIG. 12 is a schematic diagram illustrating slotted holes in an exemplary carriage frame, according to an embodiment of the present invention.

DETAILED DESCRIPTION OF THE INVENTION

Figure 1:
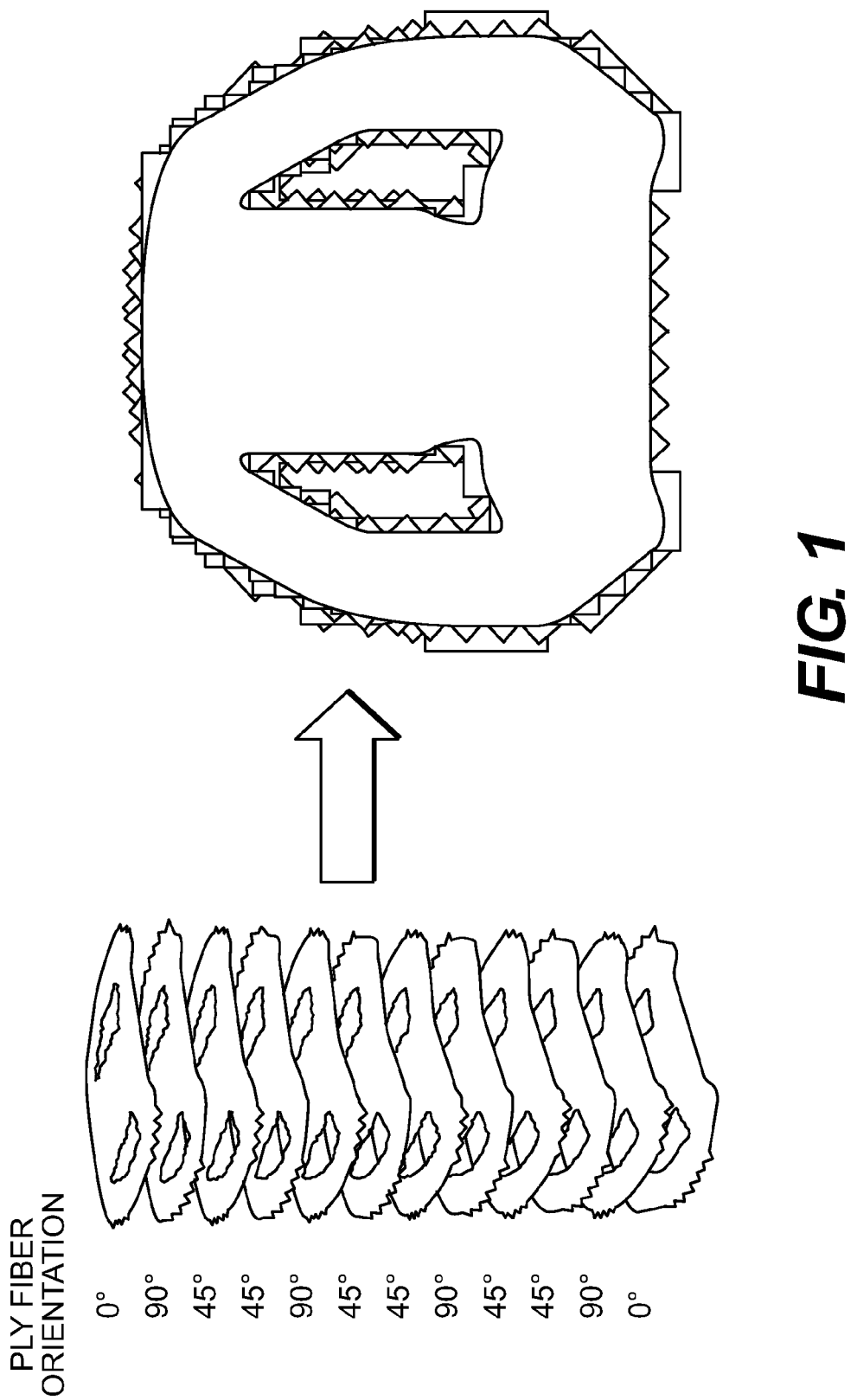
FIG. 1 is a schematic diagram illustrating an exemplary tailored blank, according to an embodiment of the present invention.

An embodiment of the present invention provides a tape placement method. As described in detail below, the tape placement method involves locating a material placement head above a tooling surface, feeding tape into a guide that holds the tape above the tooling surface, cutting the tape from the feedstock into a tape section, moving the tape section near or onto the tooling surface, and then tacking the tape section to any underlying tape layers or securing the tape section to the tooling surface.

Material

The present invention can be used to create advanced-composite preforms from tape material, such as preimpregnated fiber and polymer tape and pure polymer tape. Advanced composite materials contain reinforcing fibers, a polymer resin, and sometimes a core material such as foam or honeycomb. The part is made by stacking layers of material in one or more orientations, or ply angles. The ply angles are determined by the part's load requirements. Typically, the material that comprises the laminate will be a preimpregnated tape containing reinforcing fiber and a polymer resin. However, unreinforced polymer tape, core material, or other materials such as a metallic film could be included in the laminate based on the requirements of the application.

The reinforcing fibers can be made from, for example, carbon, glass, basalt, aramid, polyethylene, or any other reinforcement. Like string, rope, hair, or other fibers, reinforcing fibers used in polymer composites add strength and stiffness to a part along the direction of the fiber length. The fibers are preferably continuous or near continuous in length and aligned parallel with the tape length (or longitudinal axis of the tape), but no specific reinforcement format within the tape is required for the invention to be practiced. The polymer resin can be thermoplastic (for example, polyamide, polyphenylene sulfide) or thermosetting (for example, epoxy, vinyl ester, or polyester). As with most polymer composite applications, the specific resin and fibers used and their proportion and format within the composite are determined by the specific requirements of the part to be manufactured.

Process

The present invention can be used to create a laminate comprising multiple plies of tape material. Each ply contains one or more sections of tape (also called courses) placed parallel to each other, and each ply is fused to one or more underlying plies. The shape of each ply and the orientation, or angle, of the fibers in the ply relative to fibers in other plies in the laminate are chosen such that the final produced part will have the desired structural characteristics. The first step of the method used to fabricate a tailored blank is to feed tape material of a specified length from a spool into a tape section positioning system that suspends the tape above the tooling surface upon which the tape will be placed. The second step, which could occur concurrently with step one, involves positioning the tape section relative to the tool such that when the tape section is lowered onto the tool, it is in the correct position and orientation for the part. In the third step, the guide lowers the tape section and the section is either tacked to underlying material or secured to the tooling surface. Any material that directly touches the tooling surface can be secured to the tool using techniques (e.g., vacuum) that may differ from the methods used to tack tape layers to each other. Once the section of material has been secured to underlying material or to the tooling surface, the tape section locating system and tacking system return to their starting positions and a new section of material is fed into the guide and the process is ready to be repeated until the blank is complete.

Several variations or embodiments of this overall processing method could be employed. Though the process is described here as a series of sequential steps, embodiments of this method could execute these steps simultaneously to reduce overall processing time. For example, moving the tape section locating system and/or the tool into position could occur while the guide is raising and/or lowering and/or while the tape is being fed into the guide. Also, embodiments of this method could place more than one section at a time by incorporating additional placement heads into the machine. Thus, nothing in this description should imply that sections necessarily be placed one at a time. Specific embodiments of the method could include the capability to place varying widths or multiple materials in a single blank.

In addition, alternate embodiments of this invention could involve placing tape sections that have been pre-cut rather than cutting the tape after it has been fed into the guide rails.

Staging pre-cut tape before the guide rails could speed up the operation of the machine since the cut operation would be removed from the critical path in the order of machine operation. The tape sections could be pre-cut in line with the feed and placement, or the tape sections could be pre-cut off-line and staged as a kit to be fed into the guide rails.

The method used to tack plies together and the degree to which they are tacked is another parameter that could vary in different embodiments. Methods for tacking the courses to underlying plies could include contact heating, ultrasonic welding, induction welding, laser heating, hot gasses, or other methods of adhering plies to each other. Also, the method could be used with an articulating head or a moving tooling surface, or a combination of the two positioning approaches. Although an embodiment described herein uses a fixed material placement head that is positioned over a flat tooling surface that can move in the x and y directions as well as rotate, the relative motion between the placement head and the tooling surface could also be achieved by moving the placement head or a combination of the two.

Implementation of the Invention

A specific implementation of the present invention is depicted in FIGS. 1-16. This exemplary system comprises a material dispensing system 1, tape transport rails 2, a placement head 3, a vacuum table 4 that serves as the blank tooling surface, a 3-axis motion table 5, and a structural beam 6. The placement head 3 and tape transport rails 2 are affixed to the structural beam and positioned over the motion table 5 and vacuum table 4. Additional support systems are depicted and include an operator interface computer 7, an electronics control cabinets 8, a vacuum pump 9, and perimeter safety guarding 10.

As shown, for example, in FIGS. 5, 6, 16, and 17, the material dispensing system 1, also called a creel rack, contains one or more creel boxes 35 that contain tape unspooler mechanisms 11. In this system, a roll of tape 47 is loaded onto a spindle 12 and secured in place. Spool guards 13 are put in place to keep the tape from unraveling. The end of the tape is then fed around a first guide roller 48 between feed rollers 15 in a creel feed mechanism 14 and past a second guide roller 49. Then one coil of the tape is looped around the entire spool, fed around an additional set of guide rollers 16 within the creel feed mechanism, and out to the auto feeder unit 17. Once the tape is fed into the autofeeder unit, the autofeeder pinch rollers 18 engage and feed the tape through a feed guide 19 (see, for example, FIG. 17) and across the tape transport rails and into the tape placement head 3. Once the tape passes through feed rollers 23 in the tape placement head, these rollers 23 engage and the rollers 18 in the autofeeder disengage.

Figure 7:
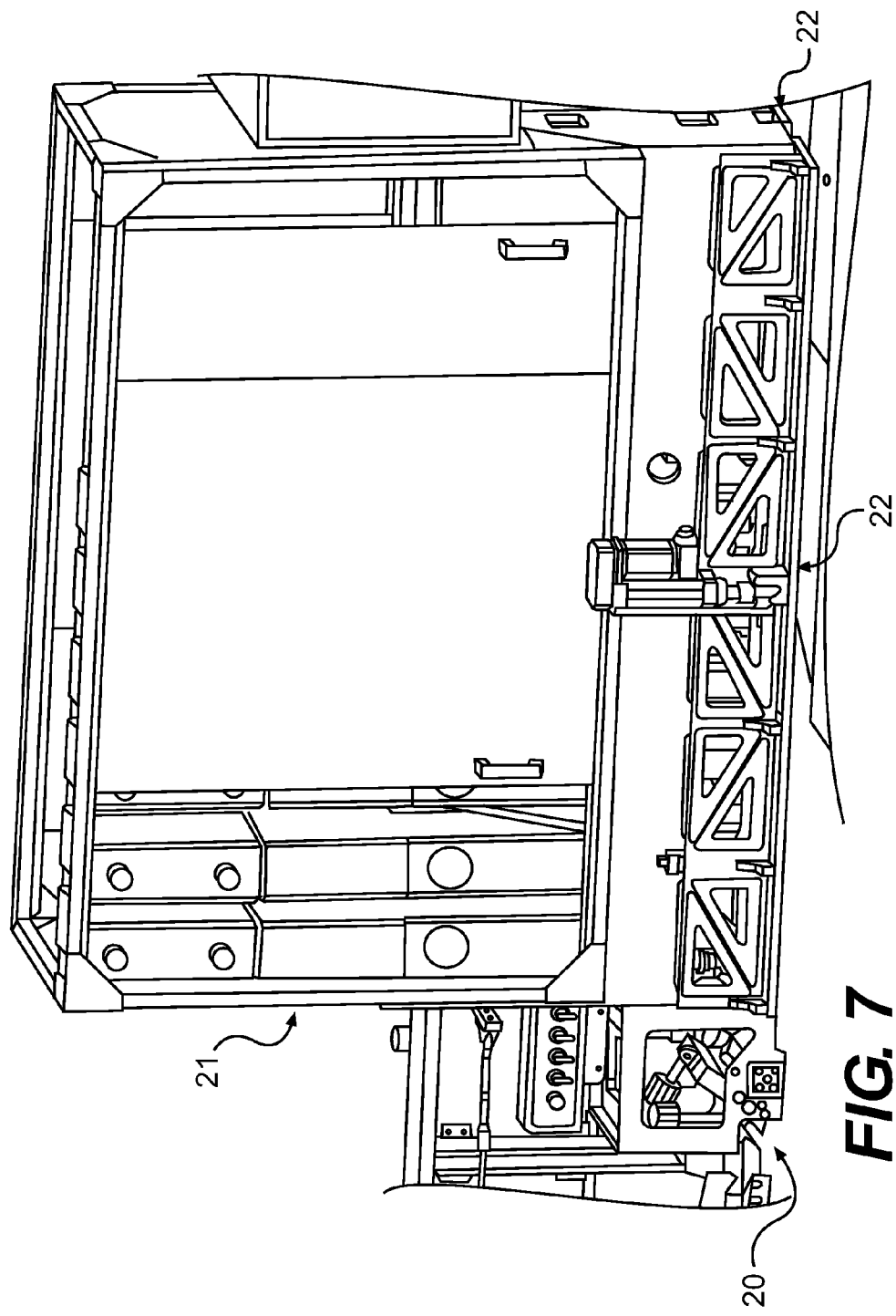
FIG. 7 is a schematic diagram illustrating an exemplary placement head, according to an embodiment of the present invention.

As shown in FIG. 7, the tape placement head 3 has three subsystems: a tape feed and cutter unit 20, a welding unit 21, and a tape carriage unit 22. Tape enters through the tape feed and cutter unit 20 and through a set of driven feed rollers 23. As shown, for example, in FIGS. 8-10, the feed rollers 23 pinch the tape and push it past an adjustable tape alignment plate 44, through a tape-cutting unit 24, and into guide rails 25 that are part of the tape carriage unit 22. Tape is fed through the guide rails 25 until the distance between the tape end and the cutter blade 45 equals the desired strip length 26. Once this point has been reached, the pinch roller stops feeding tape and the cutter unit cuts the tape. This leaves a section of tape 27 of a known length suspended between guide rails 25.

Figure 8:
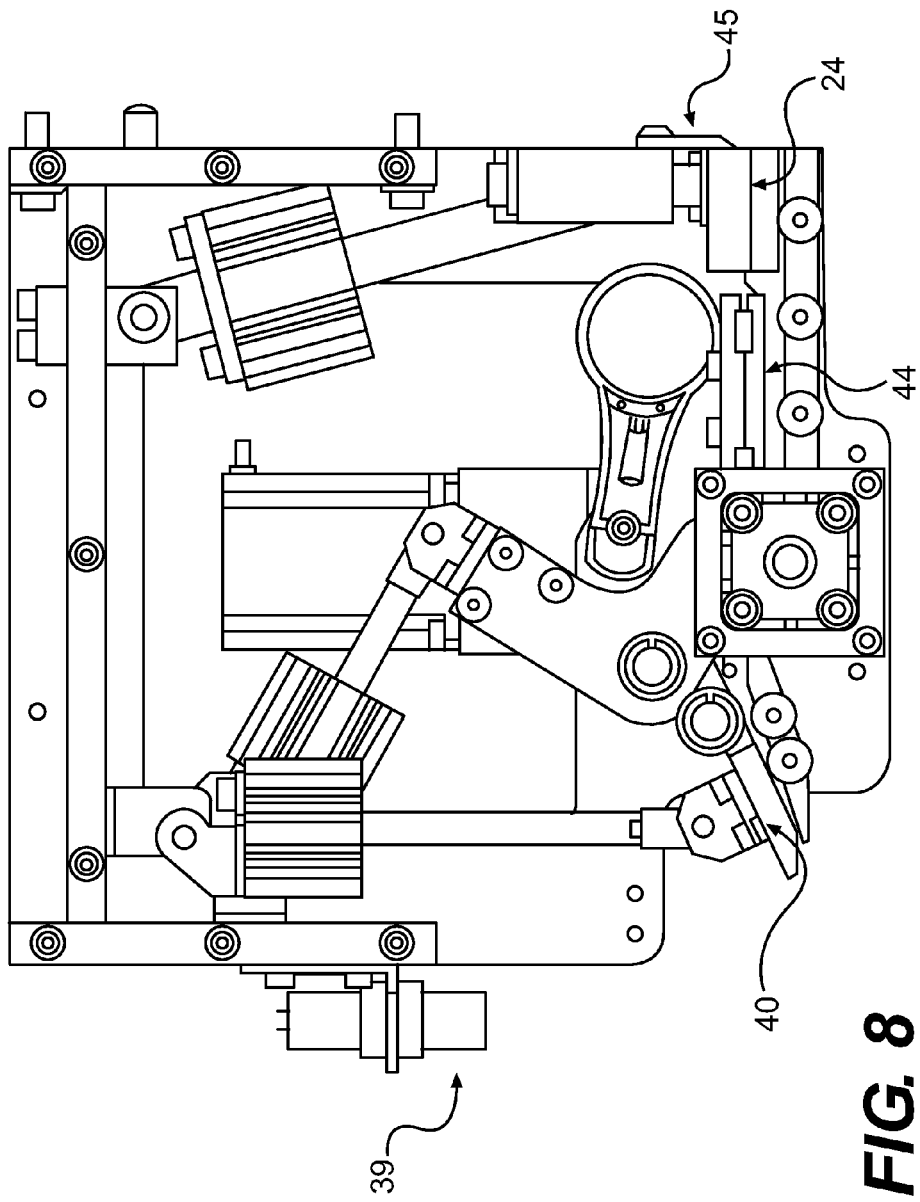
FIG. 8 is a schematic diagram illustrating a side view of an exemplary feed and cutter unit with the front frame plate removed, according to an embodiment of the present invention.
Figure 9B:
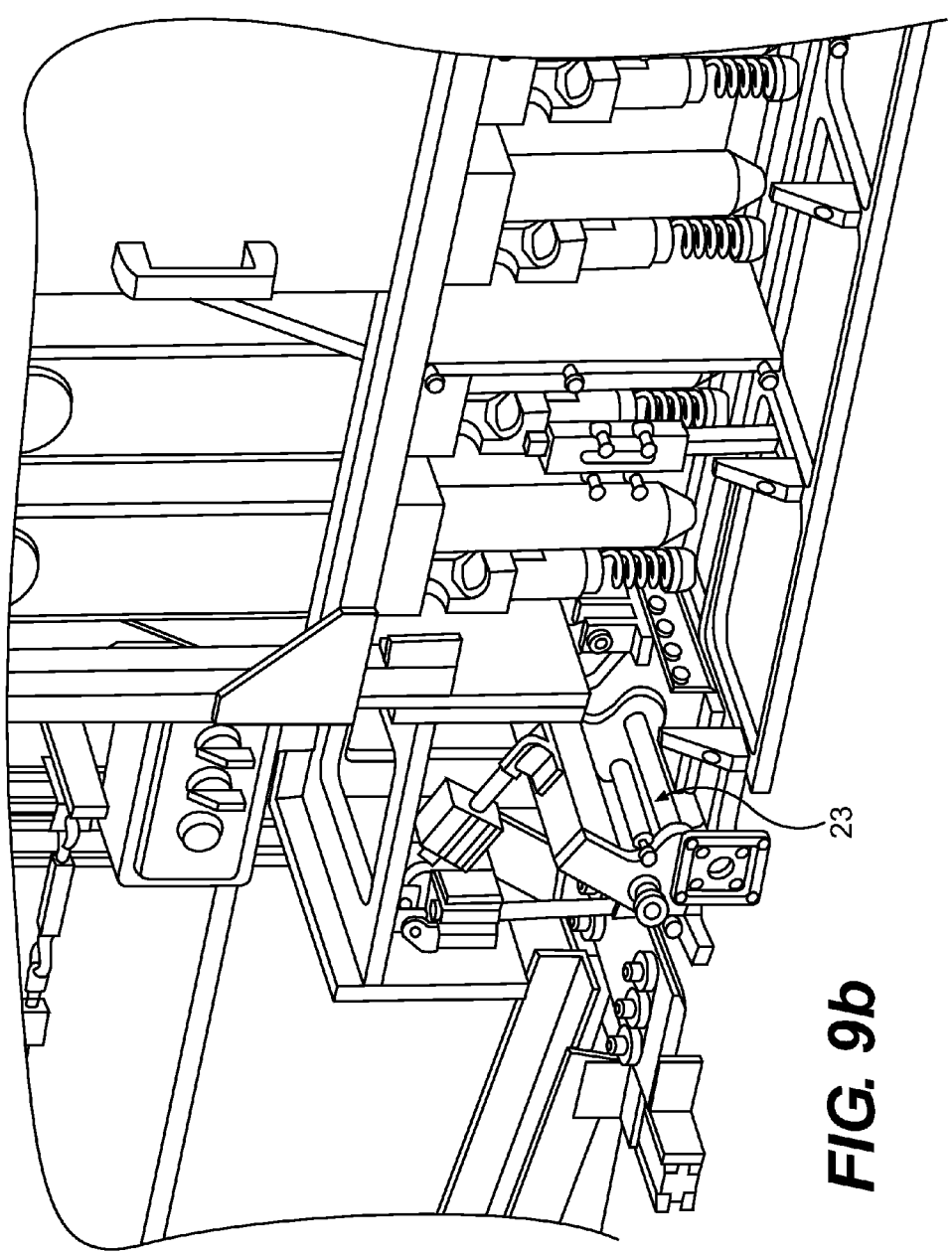
Figure 10:
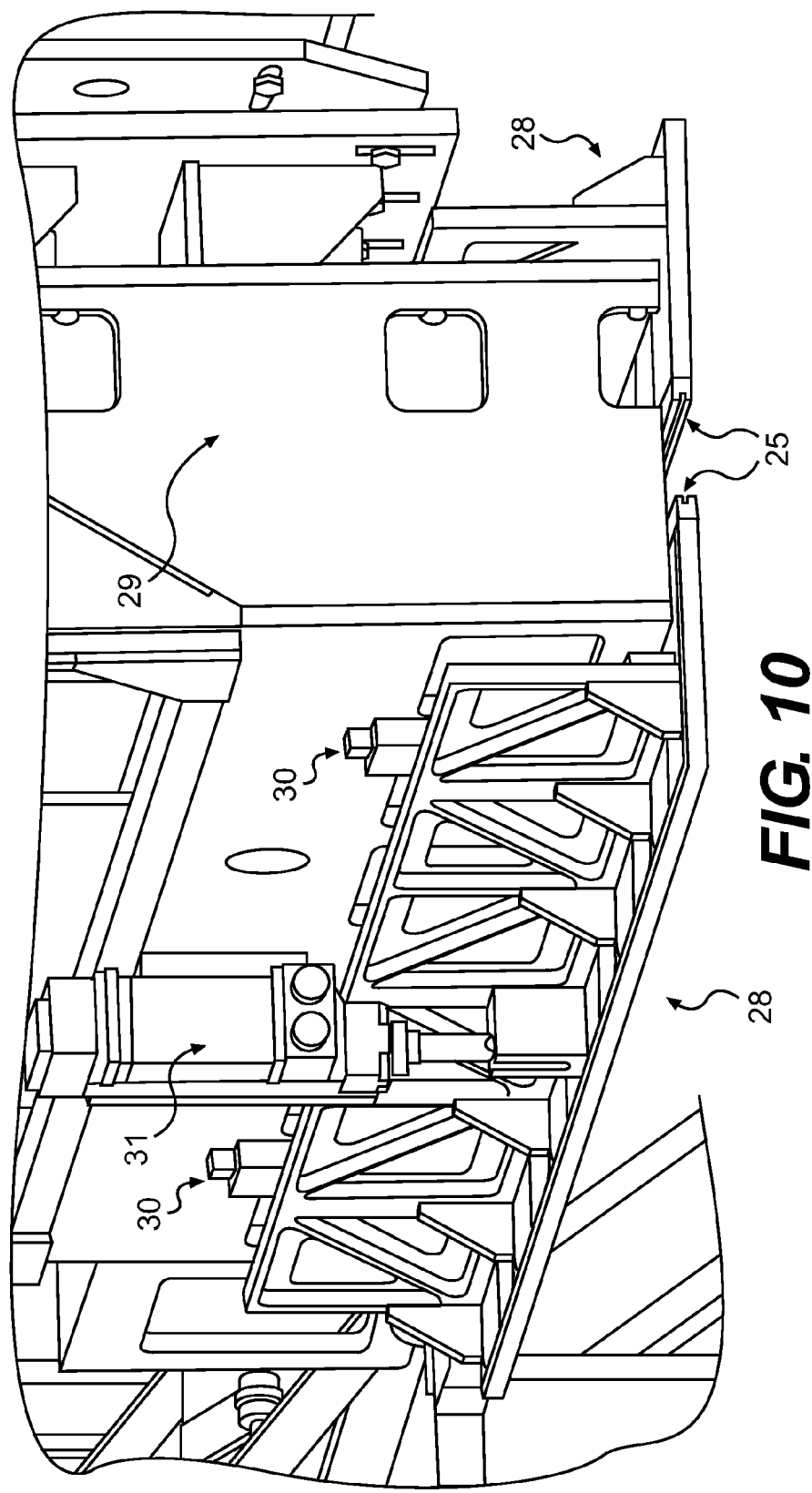
FIG. 10 is a schematic diagram illustrating a detail view of an exemplary tape carriage, according to an embodiment of the present invention.
Figure 13:
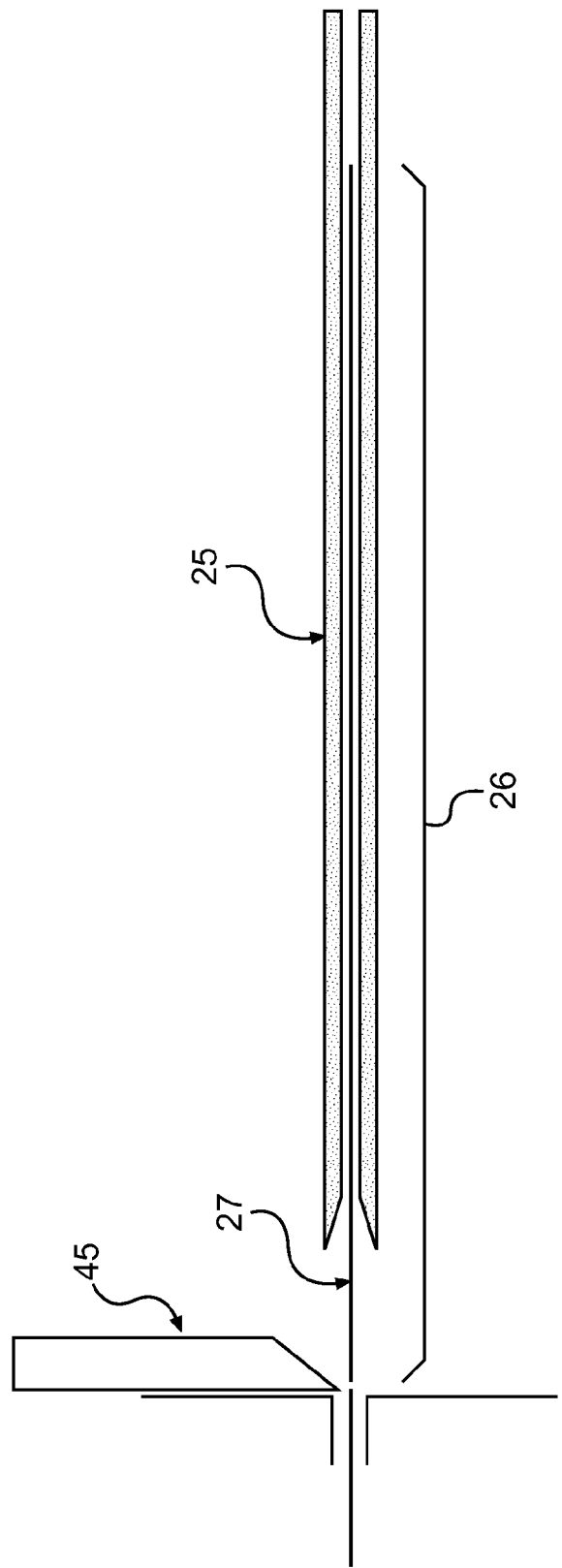
FIG. 13 is a schematic diagram illustrating a side view of tape passing through the exit of the feed and cutter unit and entering the guide rails of the carriage frame, according to an embodiment of the present invention.
Figure 14:
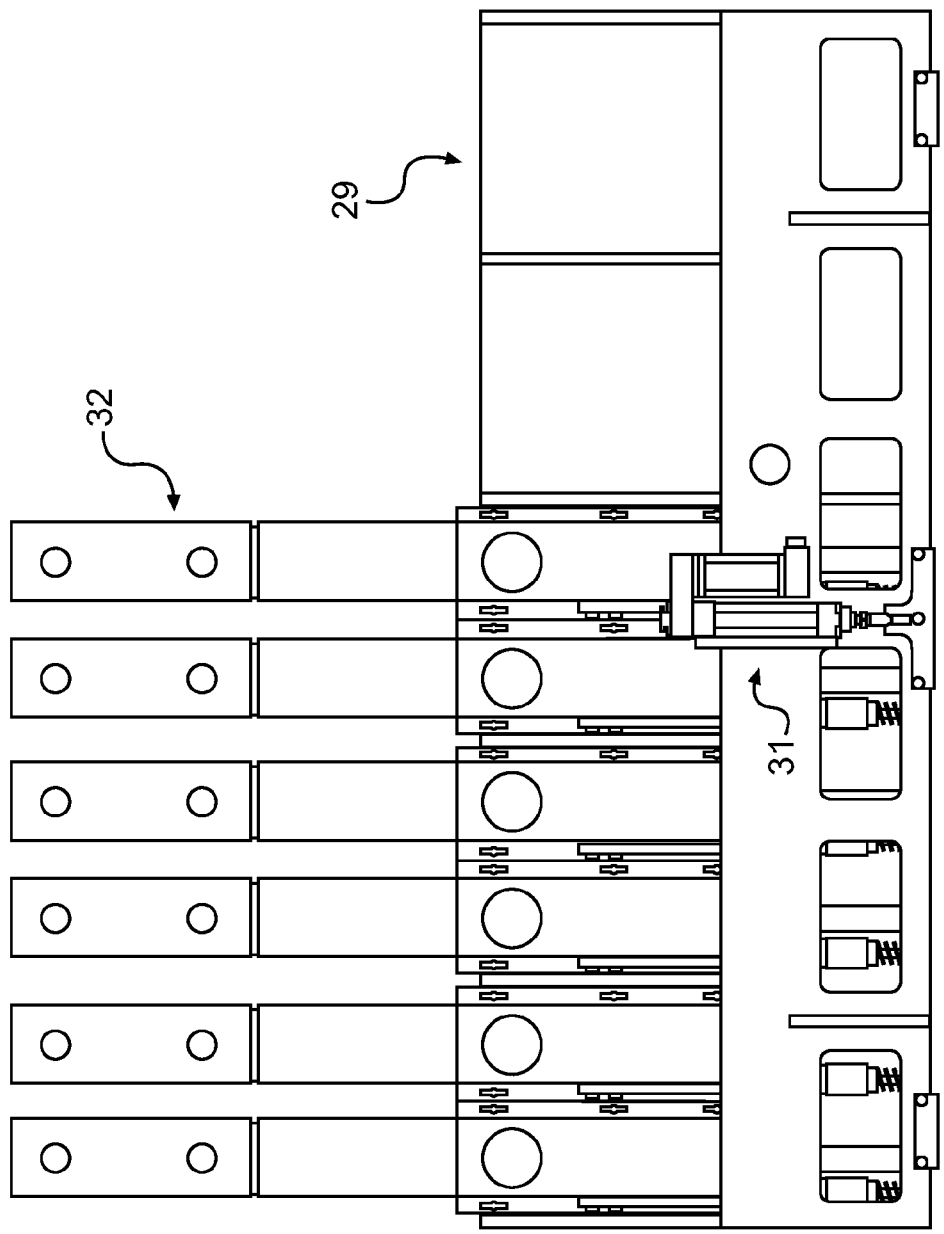
FIG. 14 is a schematic diagram illustrating a front view of an exemplary welder frame unit, according to an embodiment of the present invention.
Figure 15:
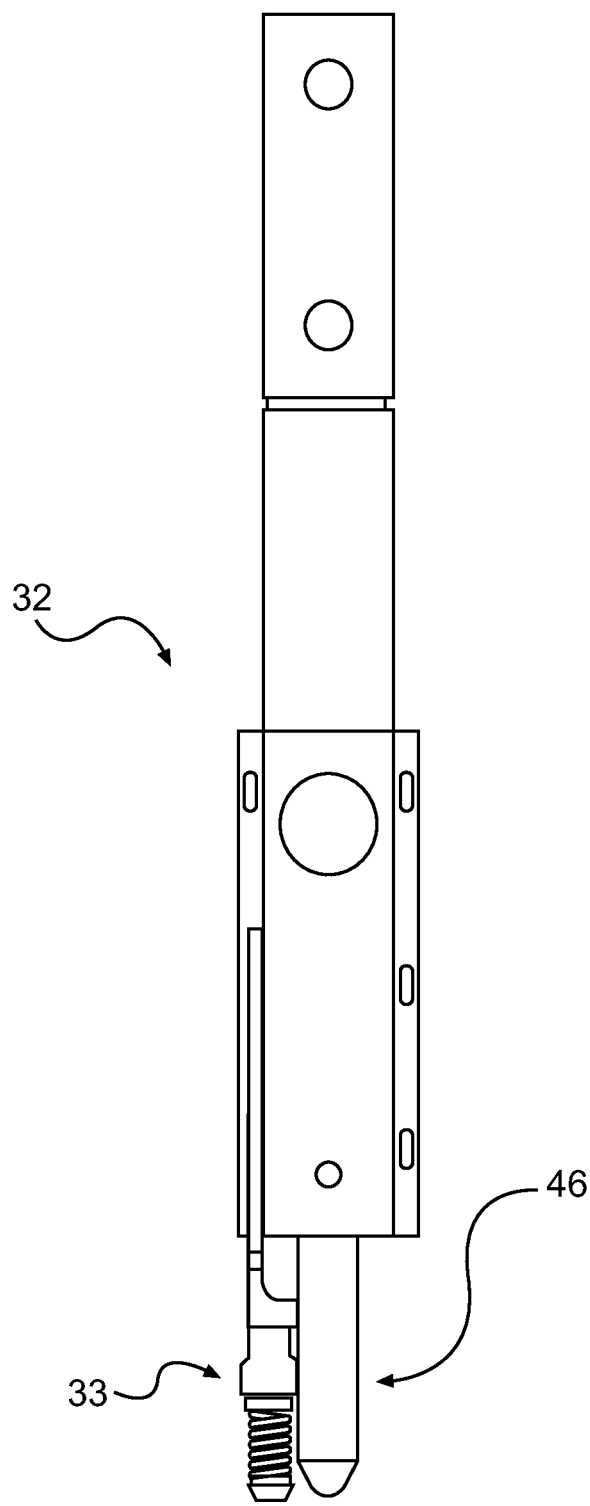
FIG. 15 is a schematic diagram illustrating a front view of an exemplary single welder unit with a pressure foot attached, according to an embodiment of the present invention.

In the feed and cutter unit depicted in FIG. 8, the cutter unit 24 comprises a blade and anvil between which the feed unit feeds the tape and whose movement is controlled such that when the blade shears past the anvil, the tape is cut into a tape section. Alternate cutter embodiments could also be used, including, for example, a rotary knife cutter, an ultrasonic knife, or a laser that could traverse a path across the width of the tape to cut it. With a traversing cutter, or similar device, the cut line could also be nonlinear, for example, curved or jagged.

The guide rails 25 are part of the tape carriage unit 22. In this embodiment, the system comprises two substantially parallel guide rails 25 that are each attached to a set of carriage frames 28. There is one guide rail and one carriage frame for each edge of the tape. Each carriage frame is affixed to the main welder frame 29 via linear slides 30 and a linear actuator 31. As shown in FIG. 12, slotted attachment holes 42 in the horizontal portion 43 of the carriage frame allow the distance of the guides from centerline of the tape 48 to be adjusted.

In this embodiment, the tape section is held between the guide rails by grooves in the guide rails in which the edges of the tape rest. Tape that has a certain degree of transverse stiffness (i.e., stiffness across the width of the tape section) stays in place just by resting on the grooves. For tape with insufficient transverse stiffness to stay in the grooves, the guide rails can be moved closer together such that the tape is squeezed and becomes cupped with the center of the tape higher than its edges. The cupped shape provides additional transverse stiffness to the tape section, allowing it to be held by the guide.

Figure 18:
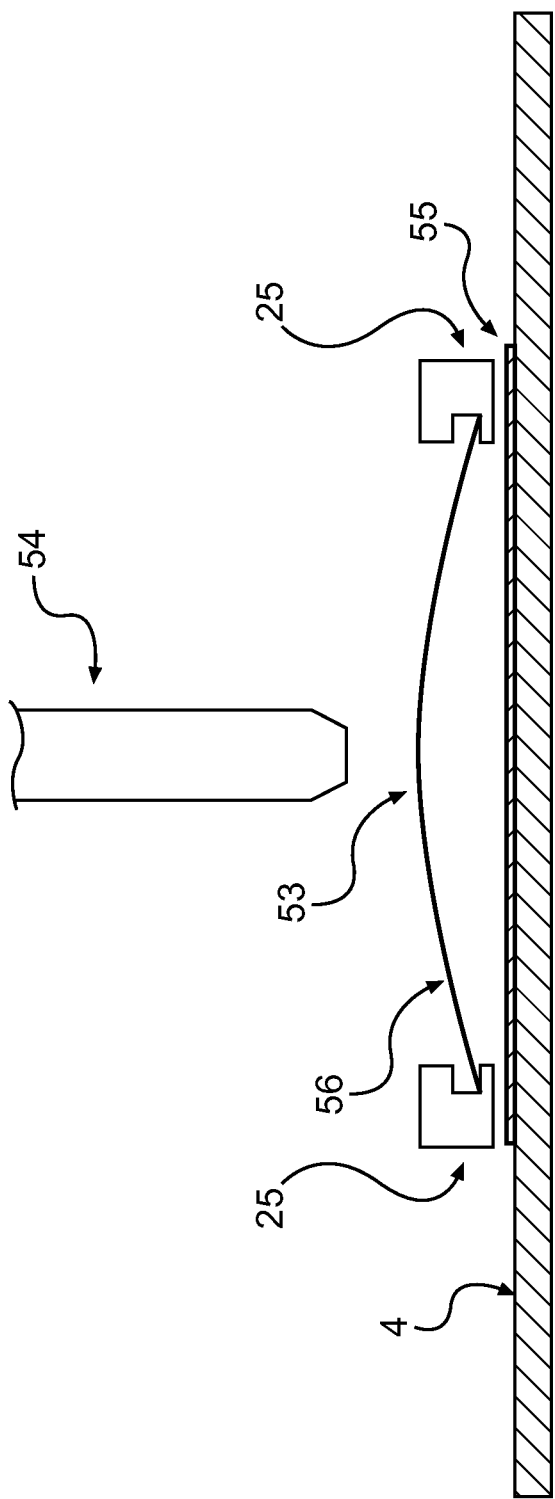
FIG. 18 is a schematic diagram illustrating an end view of a tape section cupping between guide rails and a lowered guide rail vertical location relative to a tooling surface, according to an embodiment of the present invention.

FIGS. 18-21 illustrate an exemplary system and method for handling, placing, and tacking a tape section 56 to an underlying tape section. In this example, the tape section 56 has insufficient transverse stiffness to remain in the grooves simply by resting on top of the lower surface of the grooves in the guide rails 25. Therefore, the guide rails 25 are close together such that edges of the tape section 56 are squeezed by the vertical walls of the grooves, causing the tape section 56 to become cupped with the center of the tape section higher than its edges 53, as illustrated in FIG. 18. In other words, the width of the tape section 56 is convex with respect to horizontal in FIG. 18. The cupped shape provides additional transverse stiffness to the tape section, allowing it to be held by the guide rails 25.

Figure 19:
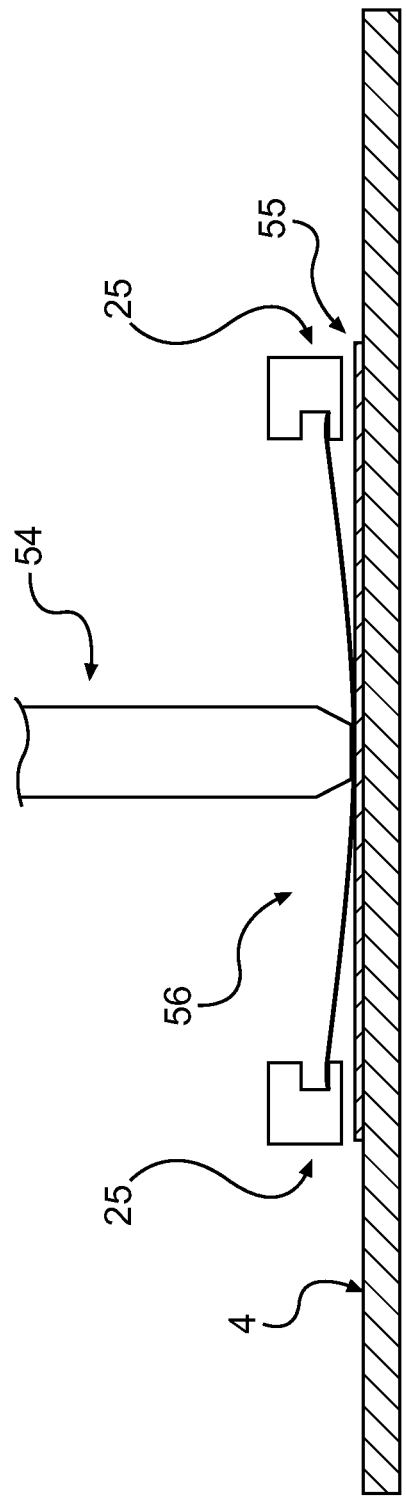
FIG. 19 is a schematic diagram illustrating an end view of a tape section being tacked to an underlying tape section, according to an embodiment of the present invention.

With the tape section 56 within the guide rails 25, the guide rails 25 lower to a point just above the tooling surface 4, as illustrated in FIG. 18. Next, as illustrated in FIG. 19, one or more pressure feet 54 lower to press the tape section 56 to the underlying material. In the present embodiment of the invention, the welder tips 46 themselves serve as pressure feet in addition to the dedicated pressure feet 33 that have also been described. Alternatively, the welder tips and pressure feet can be a single integrated device. With the tape in place and the welder tips lowered, the tape section is then tack welded to any underlying material. In some cases, the tape section will directly contact the tooling surface and in other cases it will contact previously placed tape sections 55. If the tape section underneath a welder tip is directly touching the tooling surface, then that welder does not energize, since that portion of the tape section is secured to the table, for example, with vacuum.

Figure 20:
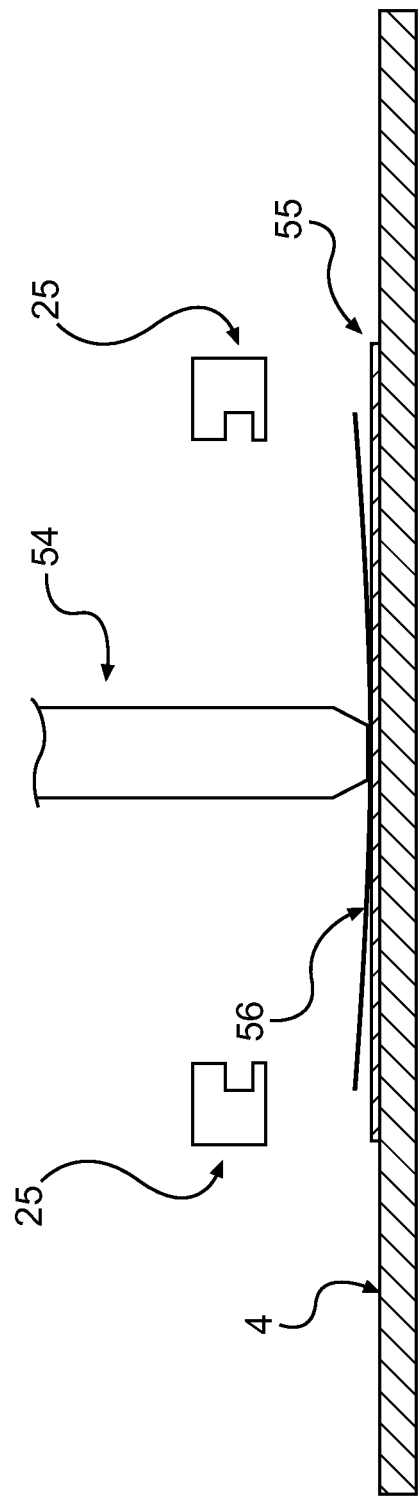
FIG. 20 is a schematic diagram illustrating an end view of a tape section being removed from guide rails as the guide rails retract and the pressure foot holds the tape section in place, according to an embodiment of the present invention.
Figure 21:
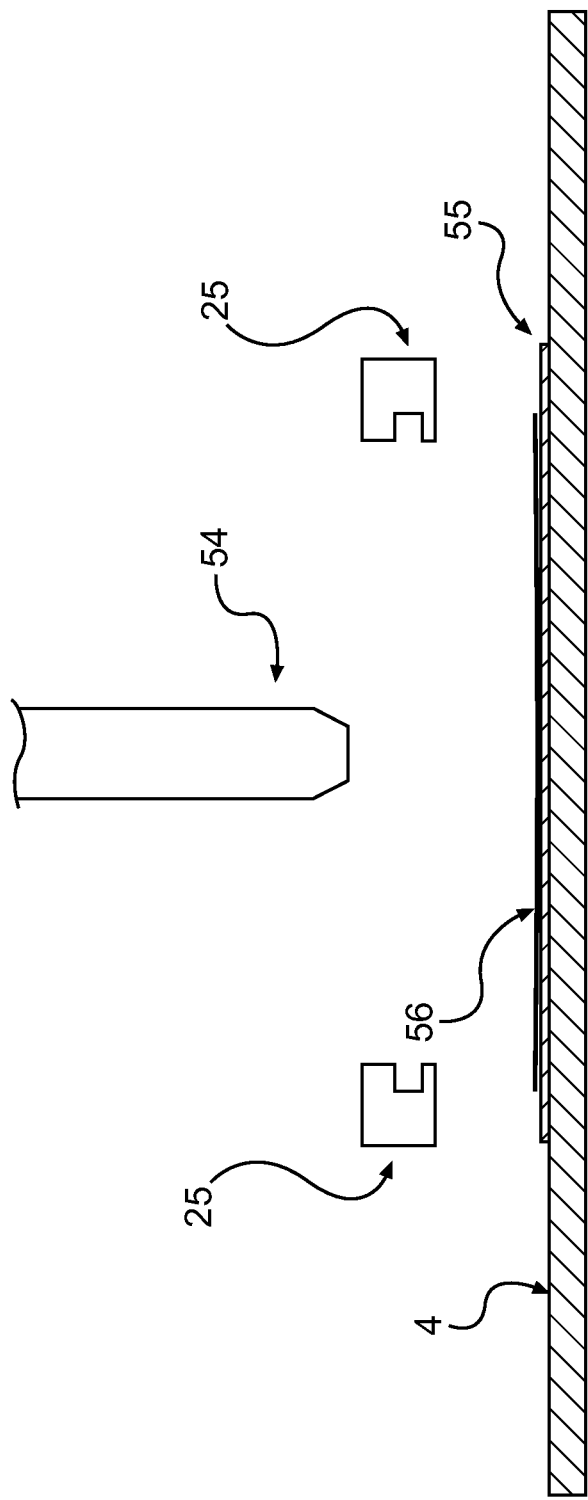
FIG. 21 is a schematic diagram illustrating an end view of guide rails retracted and pressure foot retracted, according to an embodiment of the present invention.
Figure 22:
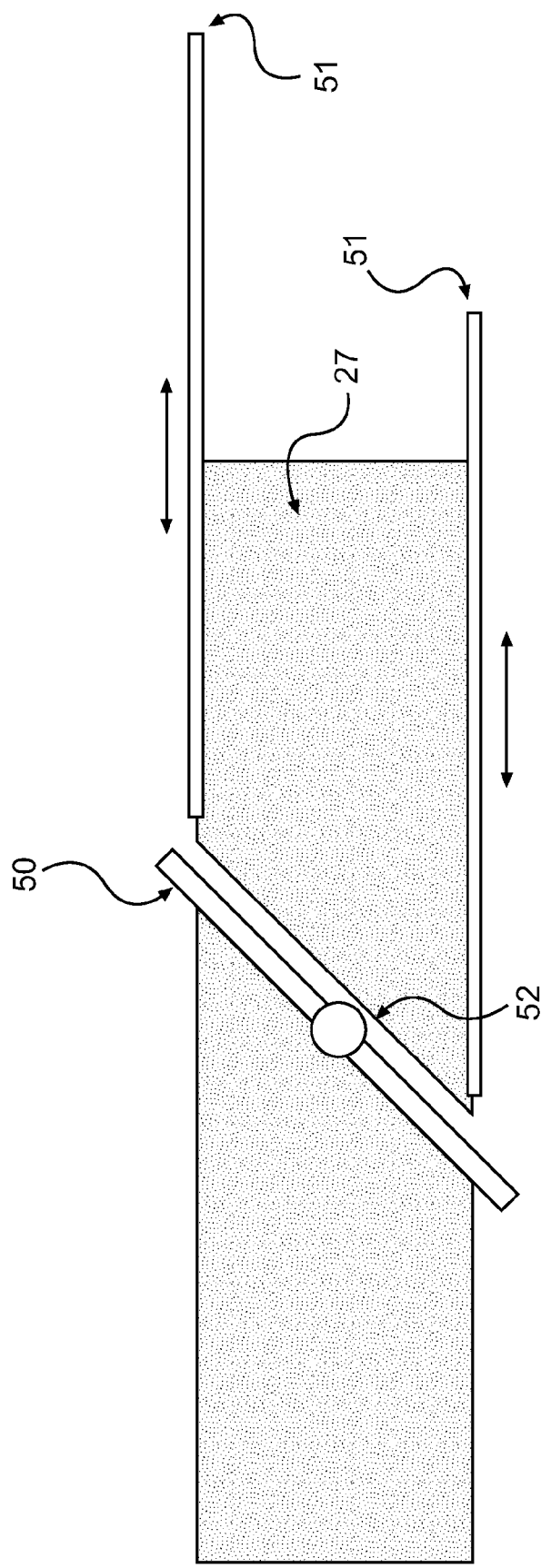
FIG. 22 is a schematic diagram illustrating lateral movement of guide rails with an angled cutter, according to an embodiment of the present invention.
Figure 23:
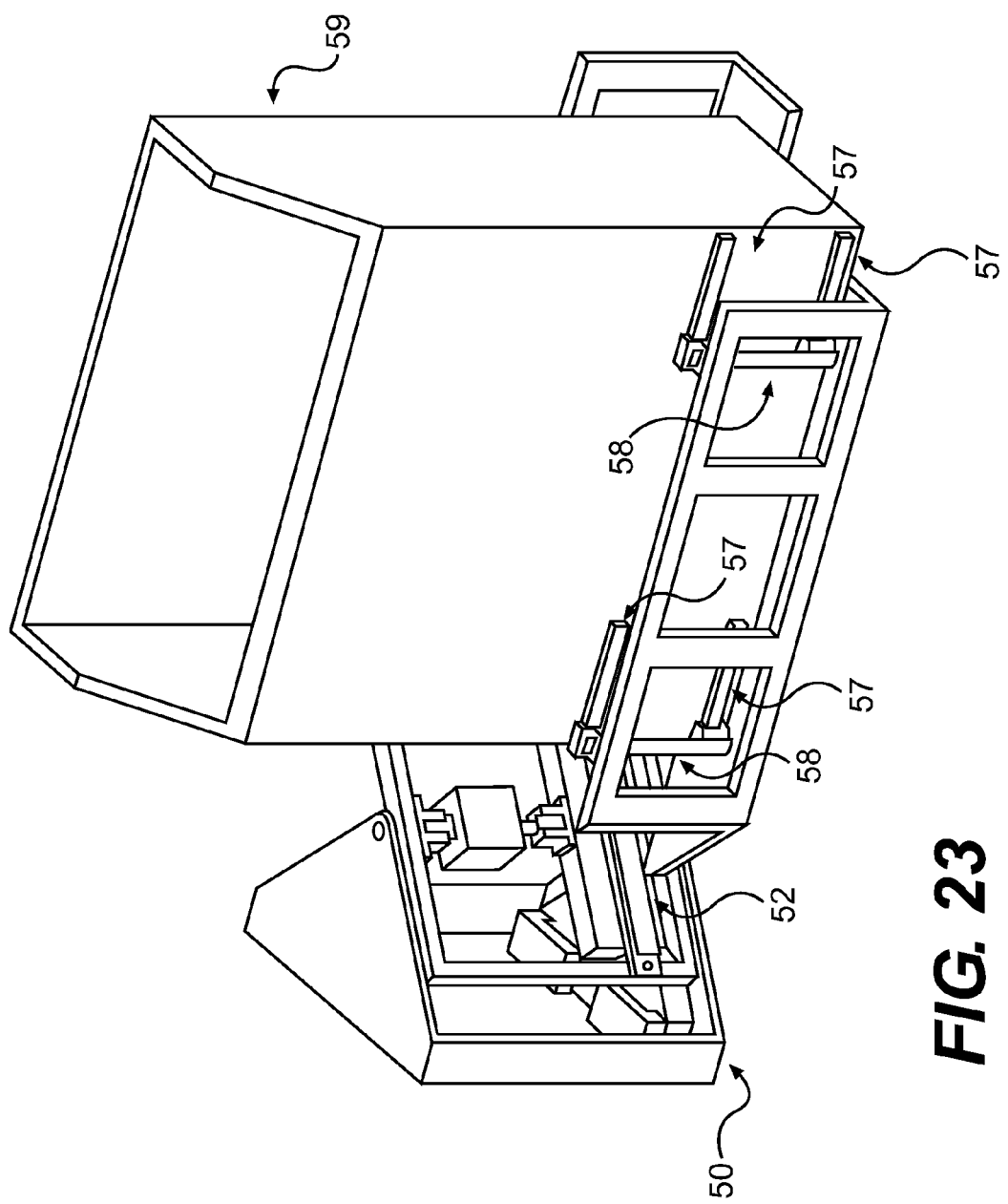
FIG. 23 is a schematic diagram illustrating an exemplary angled cutter and horizontally actuating guide rail mechanism with the cut angle in the +45° cut position, according to an embodiment of the present invention.

Once the welds have been made, as illustrated in FIG. 20, the guide rails 25 rise up with the pressure feet still pressing on the tape. This causes the tape edges to slip out of the grooves of the guide rails 25, releasing the tape section 56 from the guide rails 25. Then, as illustrated in FIG. 21, the pressure feet retract, leaving the tape section 56 secured in place on the tooling surface 4.

The vacuum table 4 serves as the tooling surface upon which the part is built up. The vacuum table is attached to a three-axis motion platform 5 that precisely positions the vacuum table under the placement head. Instructions from an off-line program determine the length of tape and its position and orientation on the table. While the tape is being fed into the guide rails 25, the motion platform 5 moves the vacuum table under the placement head to the desired x-axis, y-axis, and rotary angle coordinates.

Figure 2:
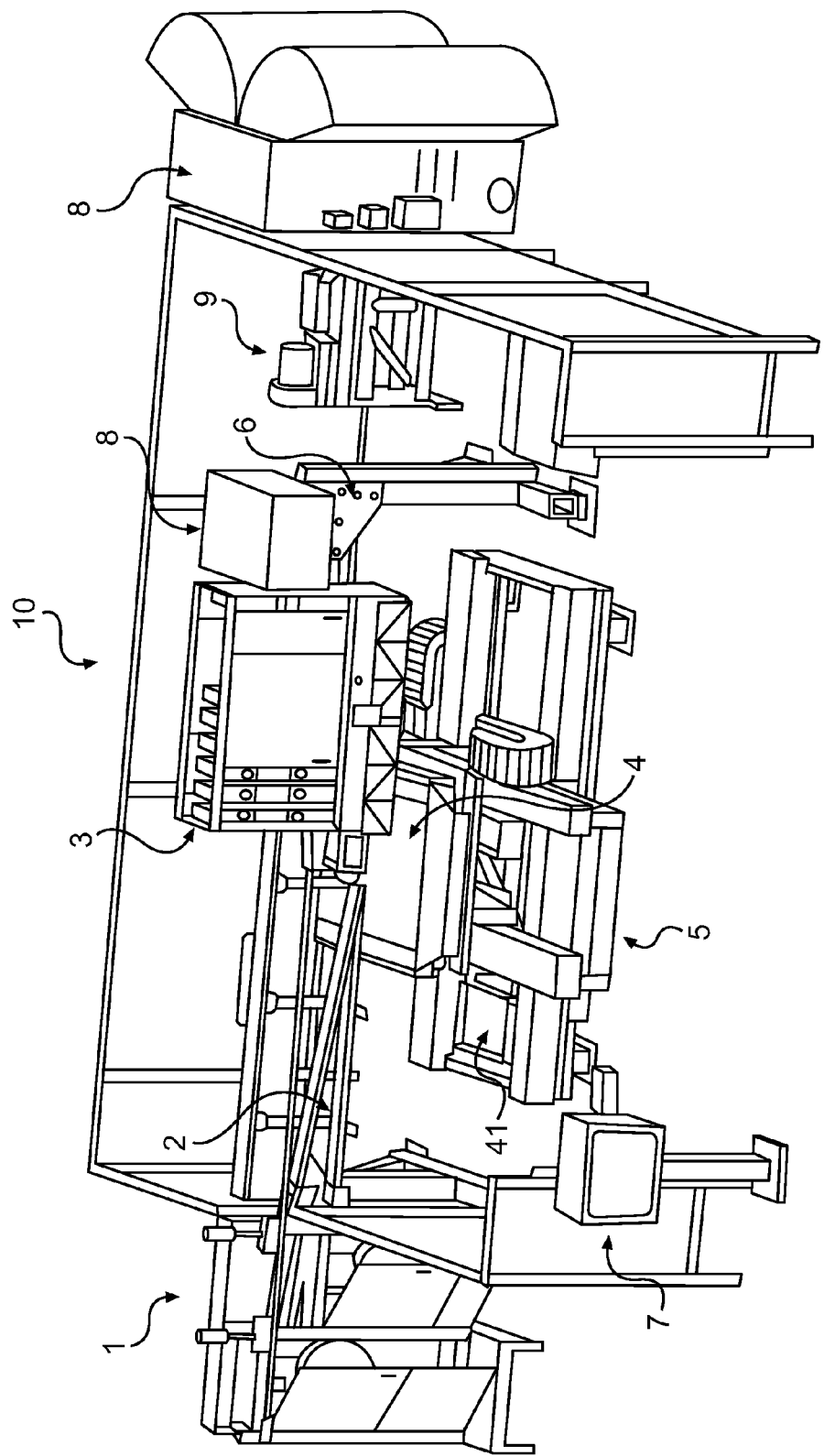
FIG. 2 is a schematic diagram illustrating an isometric view of an exemplary system for applying composite tape, according to an embodiment of the present invention.
Figure 3:
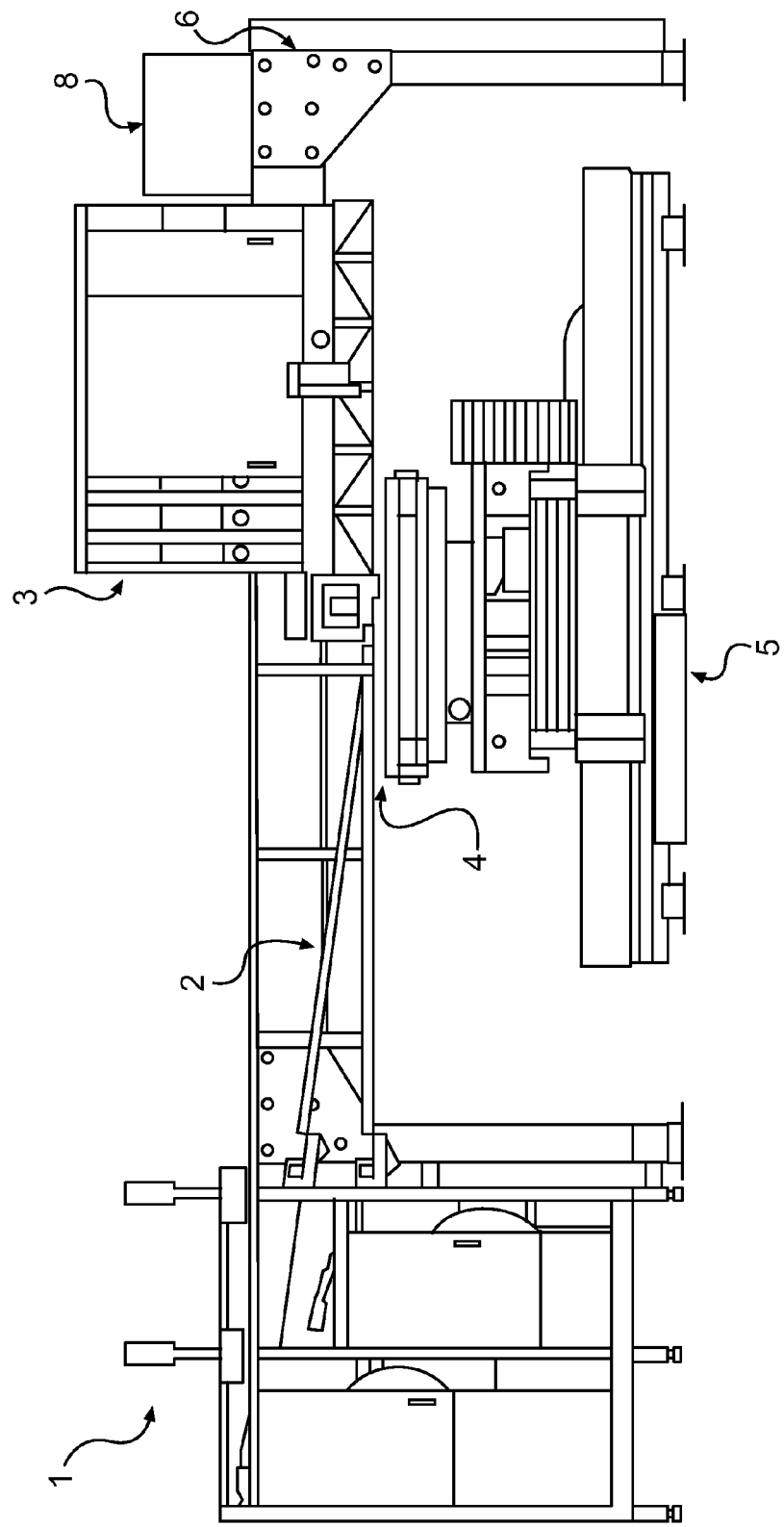
FIG. 3 is a schematic diagram illustrating a front view of the system shown in FIG. 2.
Figure 4:
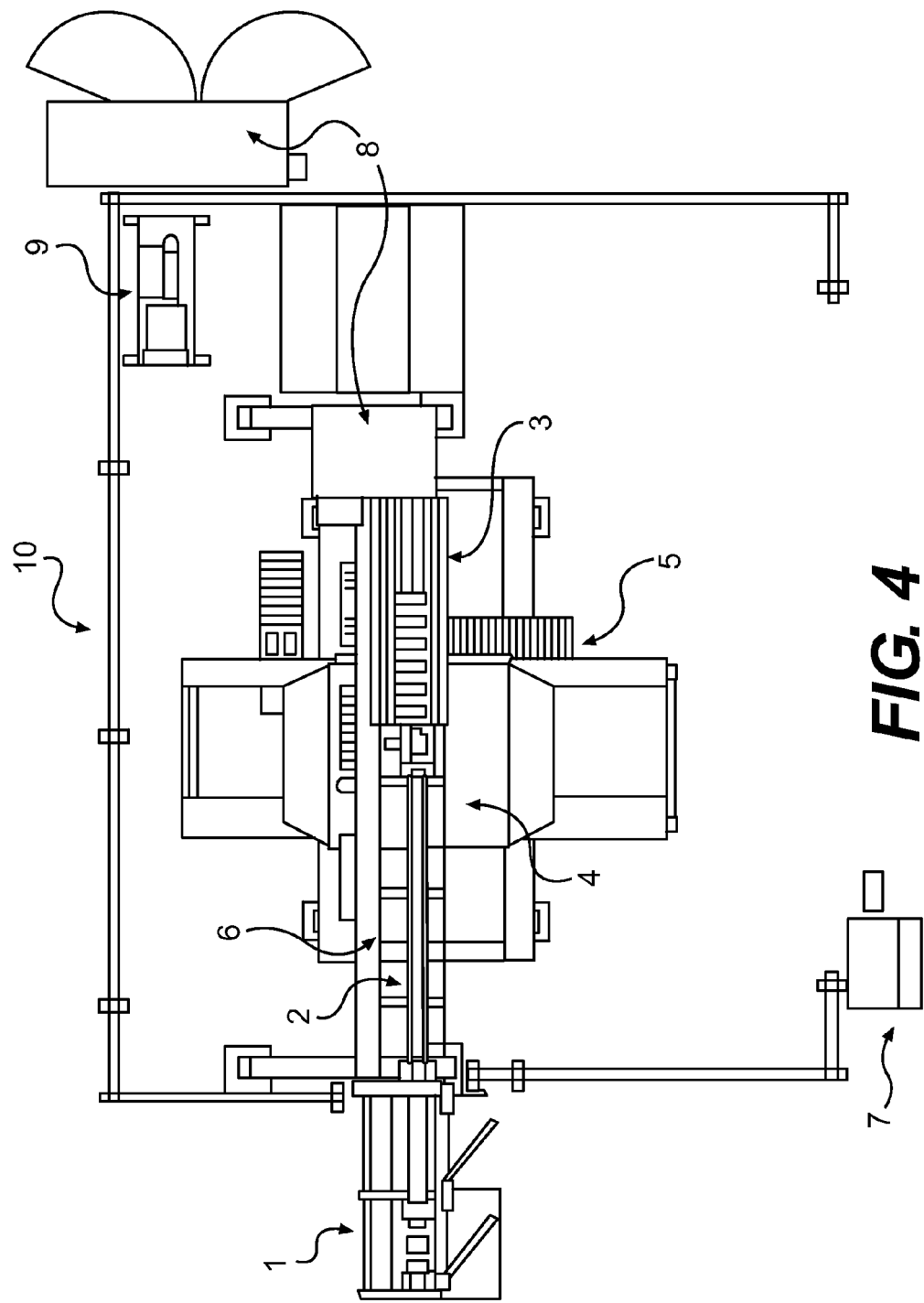
FIG. 4 is a schematic diagram illustrating a top view of the system shown in FIG. 2.
Figure 5:
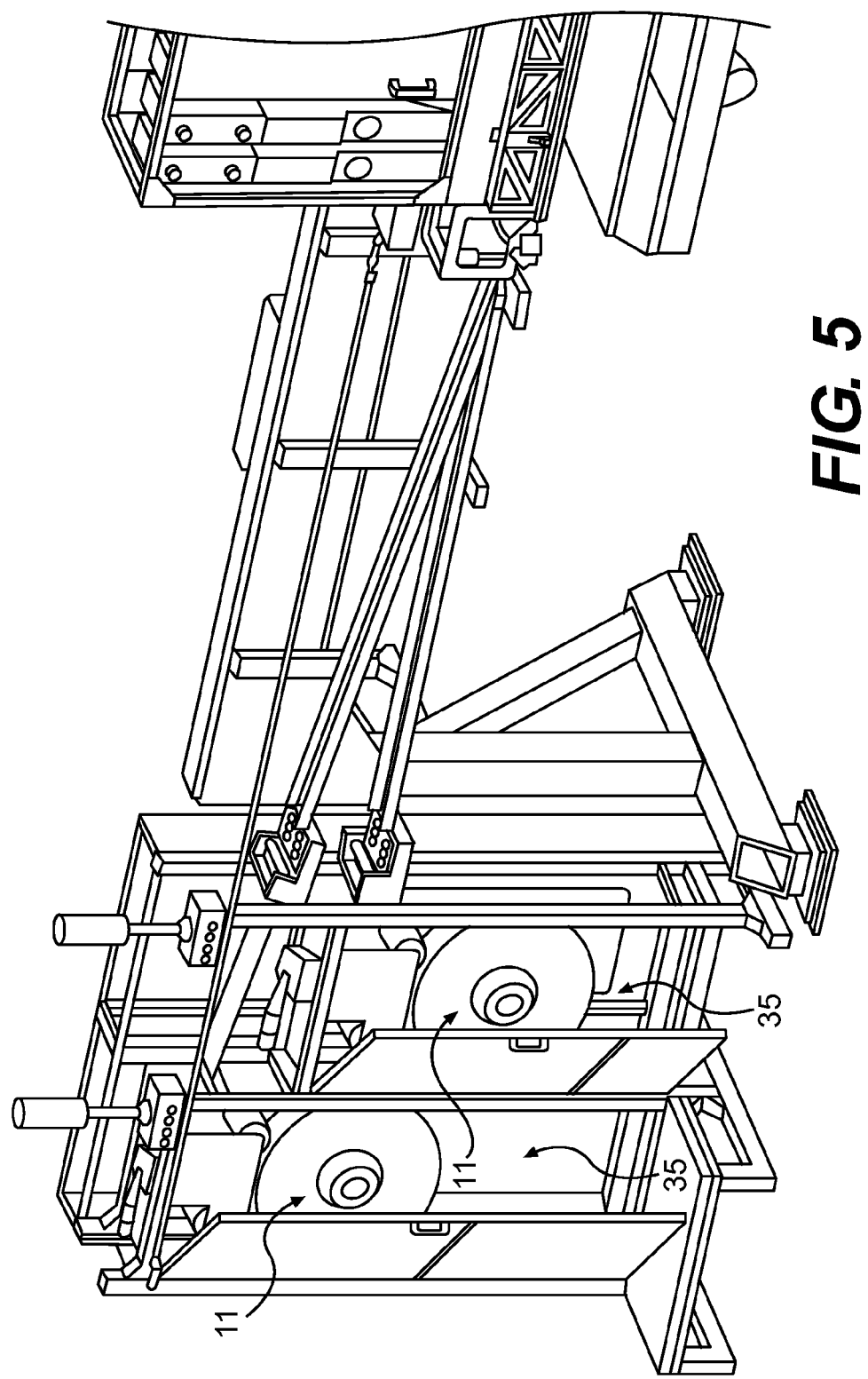
FIG. 5 is a schematic diagram illustrating a detail view of an exemplary material dispensing system and tape transport rail, according to an embodiment of the present invention.
Figure 6:
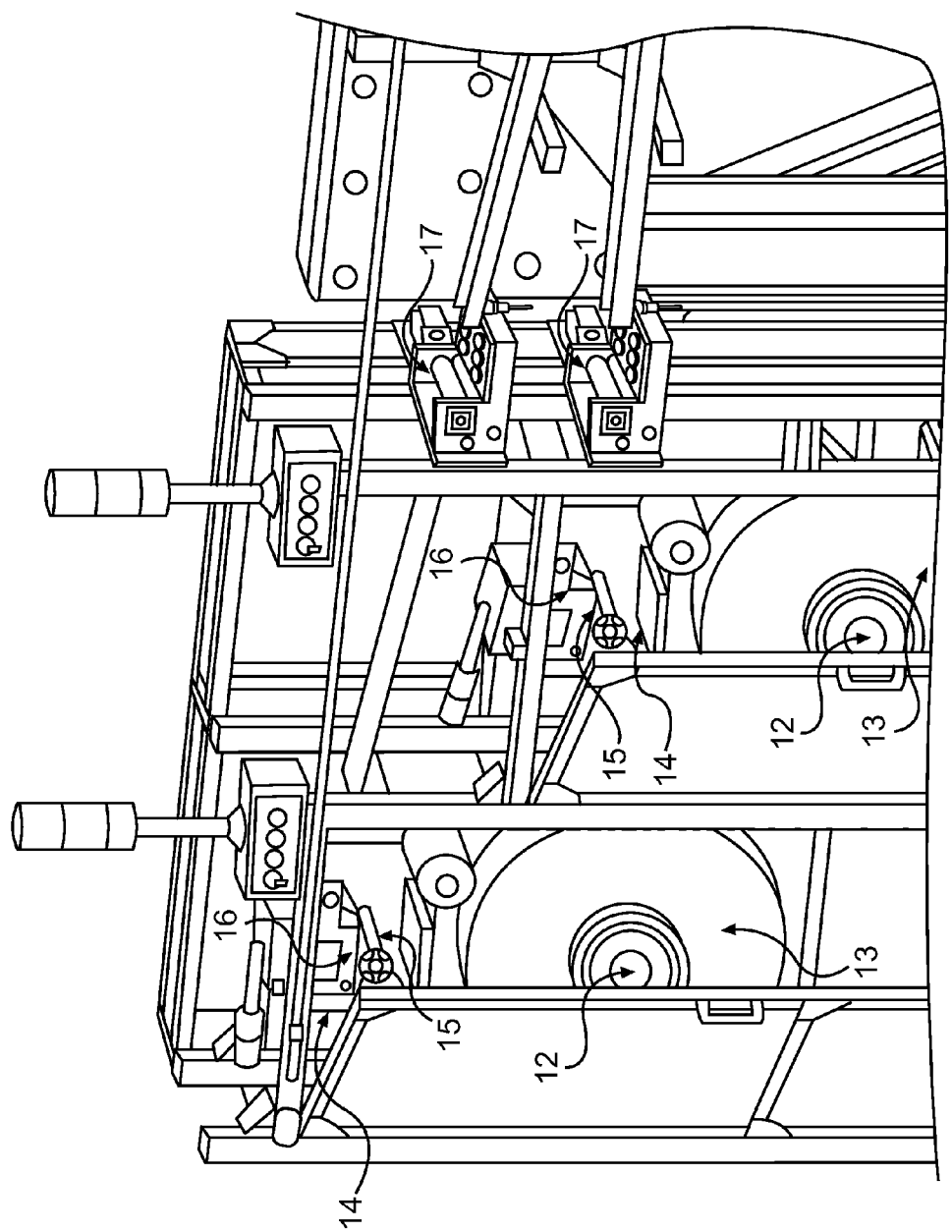
FIG. 6 is a schematic diagram illustrating a detail view of an exemplary material dispensing system and autofeed unit, according to an embodiment of the present invention.

When the tape has been fed into the guide rails 25 and cut from the roll into a section, and the vacuum table 4 has been positioned in the desired location, the carriage frames 28 lower until the tape section is nearly touching a previously laid ply or the tooling surface. Then an array of one or more welder units 32—six welder units are illustrated in FIGS. 2, 4, and 7—lowers from the welding unit 21 and presses the section of tape onto the tool. In addition to the welder tip 46, a pressure foot 33 is attached to each welder actuator (see, for example, FIGS. 14 and 15). This pressure foot also presses down on the tape to hold it in place until it has been tacked to the underlying material.

At this point, the tape under each welder tip is either directly contacting the vacuum table 4, which is the tooling surface, or is resting on top of previously placed material. In the first condition, the tape section is held in place by the table's vacuum. In the second case, the welder will turn on and tack the top layer of tape to the underlying material. In an embodiment of the invention, the welders use an ultrasonic impulse to create a weld.

When the welding/tacking step is complete, the welder units remain in contact with the tape and the carriage frame begins to lift up and return to its load position. Since the center of the tape remains secured to the tool and pinned down by the welder units, this causes the edges of the tape to slide out of the guide rails 25. Once the tape edges are free of the guide rails 25, the welder units retract, leaving the tape section in place on the vacuum table tooling surface.

This procedure is repeated for each section of material that will comprise the blank. After the final tape section has been placed, the table vacuum is turned off, which allows the part to be removed easily from the table.

Figure 16:
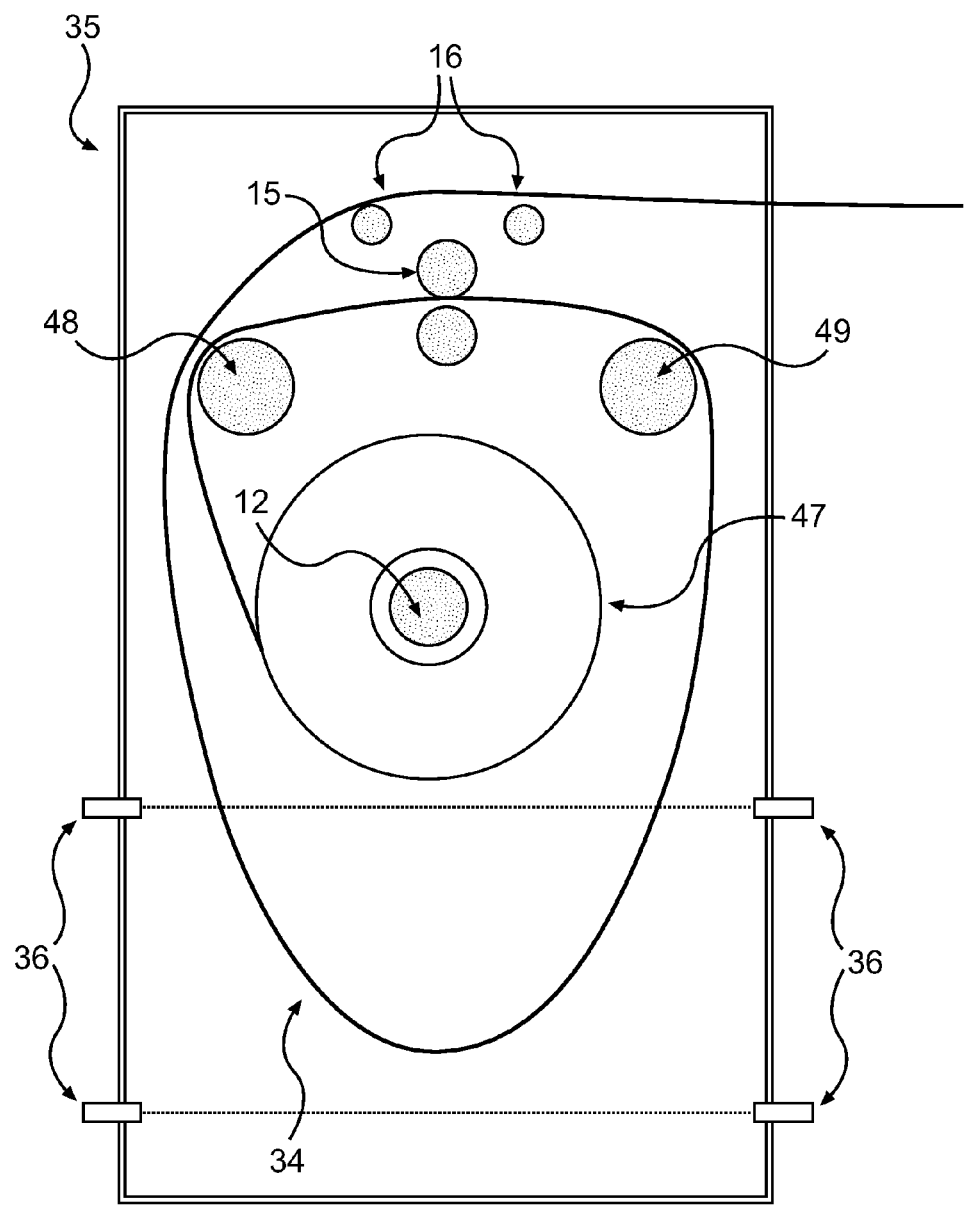
FIG. 16 is a schematic diagram illustrating an exemplary configuration of an unwind and slack system, according to an embodiment of the present invention.
Figure 17:
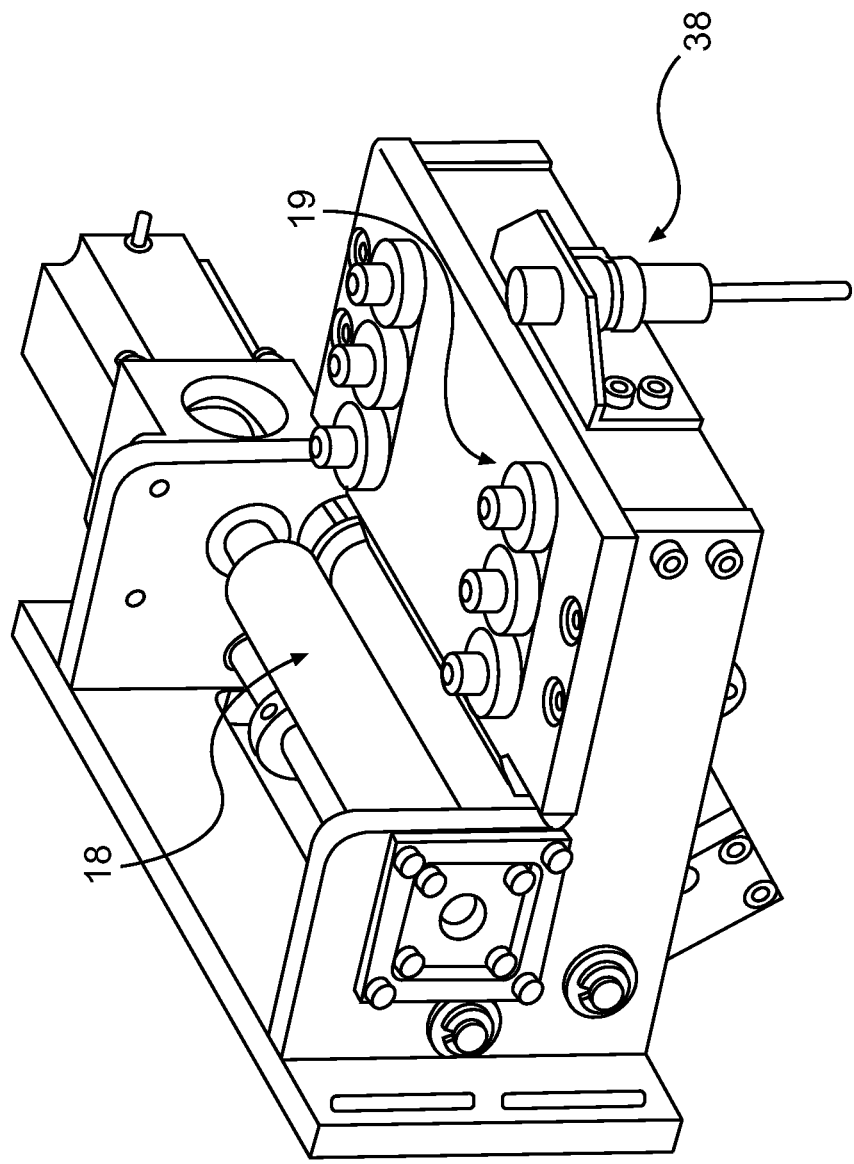
FIG. 17 is a schematic diagram illustrating a detail view of a single autofeeder unit, according to an embodiment of the present invention.

For the placement head 3 to feed tape quickly into the guide rails 25, the tape preferably has very low back tension. Without active tension control, the inertia of the spool of material could resist the rapid acceleration and deceleration of the tape as the feed rollers push tape into position. Thus, as shown in FIG. 16, the material dispensing system 1 actively unspools the material roll so that it puts slack in the final loop of material 34 within the creel box 35. The amount of slack is determined by the length of the tape section to be placed. This slack loop leaves very little back tension in the tape and allows the placement head to feed material very quickly. Sensors within the creel box 36 inform the control system if the slack loop is getting too small or too large.

The pinch roller can feed tape from a spool into a slack coil of tape within a creel box and can be configured to maintain the slack loop size to within a determined range using feedback by one or more slack loop position sensors. Maintaining slack at the end of a tape spool reduces back tension in the tape as the tape feeds. Actively uncoiling the tape spools of the tape supply unit minimizes tape tension between the tape feed unit and the tape spools.

During operation, several events can interrupt the normal sequence of actions. Several sensors are put in place to flag such events and to handle them. One event is the feed roller failing to feed the correct amount of tape. This has been addressed by incorporating an encoder wheel 37 (FIGS. 9a and 9b) that measures how much tape is being fed. If the measured feed length does not agree within a certain tolerance to the desired feed length, then corrective action is taken.

The system also senses when the end of the roll of material has been reached. When the end of the roll is reached, a sensor 38 (FIG. 17) in the autofeeder unit 17 detects the end of the tape. The system continues to feed the tape until a second material detection sensor 39 (FIG. 8) at the entrance to the placement head 3 detects the tape end. When the tape end passes this point, the feed roller stops and a redirect plate 40 within the placement head is engaged, pushing the tape end downward. The motion platform then moves the vacuum table out from under the placement head and the feed roller 23 reverses its motion and thereby feeds the final strip of tape into a catch basin 41. Then, if the second creel box is loaded with the same tape, the system can run the autofeeder to load the placement head with new material and operation can continue without further delay.

The second creel box can be used for more than one purpose. If the tailored blank includes more than one type of tape material (for example, glass fiber tape and carbon fiber tape), then the creel boxes could be loaded with different materials. Then, the placement head would be able to lay up two types of material without having to be reloaded manually. Rather, the pinch rollers in the autofeed unit of one creel box could retract tape a sufficient distance so that tape from the other creel box can be fed into the placement head.

In the embodiment described herein, the machine can be set up to process different tape widths. To change widths of tape to process, adjustment is made to the creel boxes so that the centerline of the tape roll is aligned with the centerline of the welder tips. The distances between the guide edges of the feed guides, tape transport rails, and carriage frame are then widened or narrowed to accommodate the desired tape width. In one embodiment, the adjustments are made manually. Another embodiment employs automatic width adjustment. This automatic adjustment can speed the setting up of the equipment to run different widths of material and it can allow multiple tape widths to be laid up in a single blank without having to stop and adjust the equipment.

Figure 24:
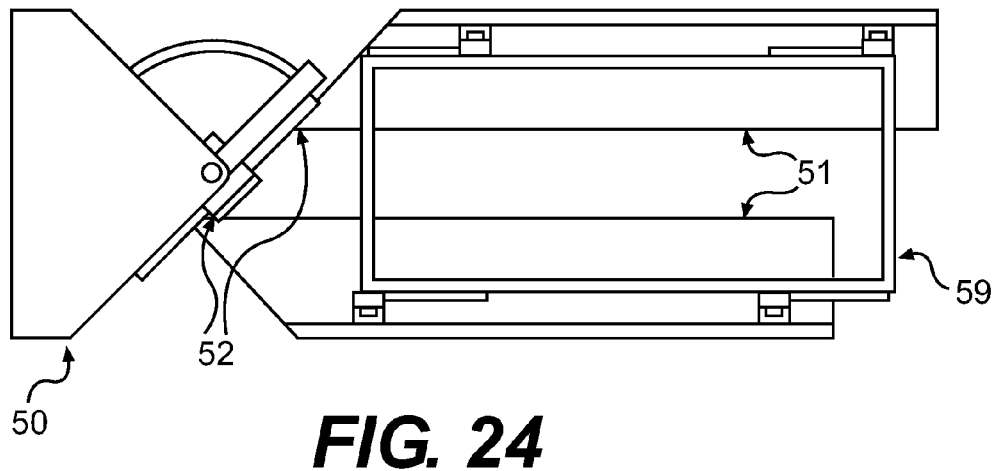
FIG. 24 is a schematic diagram illustrating a top view of the angled cutter and horizontally actuating guide rail mechanism of FIG. 23, with the cut angle in the +45° cut position.
Figure 25:
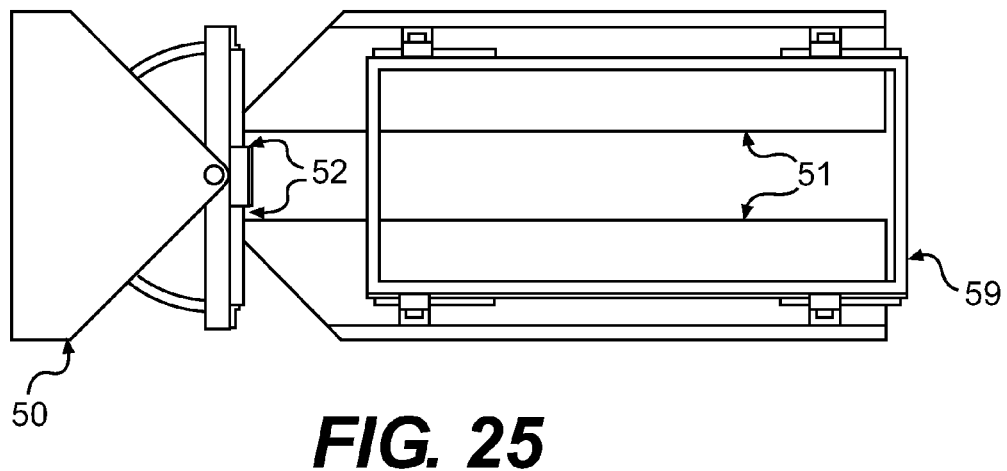
FIG. 25 is a schematic diagram illustrating a top view of the angled cutter and horizontally actuating guide rail mechanism of FIG. 23, with the cut angle in the 0° cut position.
Figure 26:
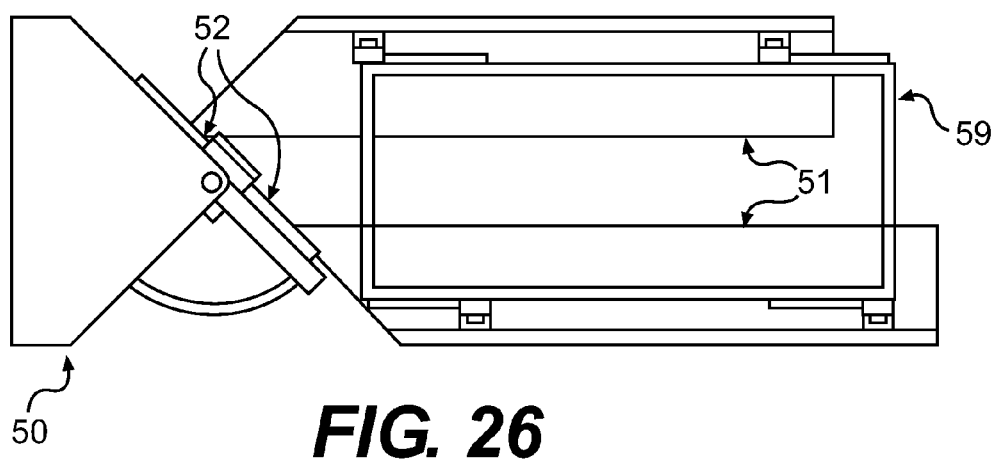
FIG. 26 is a schematic diagram illustrating a top view of the angled cutter and horizontally actuating guide rail mechanism of FIG. 23, with the cut angle in the −45° cut position.

An alternative embodiment of the present invention adds the ability to cut tape so that the cut edge is not always perpendicular to the sides of the tape. Adding the ability to vary the cut angle can give tailored blanks more degrees of freedom that can in turn lead to improved blank performance. An exemplary angled cutting system is illustrated in FIGS. 22-26, according to an embodiment of the present invention. In this system, cutter unit 50 rotates about its center and guide rails 51 each move forward and backward to maintain a close distance between the cut edge 52 of the tape section 26 and the guide rails 51. In the embodiment depicted, the horizontal movement is achieved by adding horizontally oriented linear slides 57 and actuators to the welder frame 59 upon which the vertically oriented linear slides 58 and actuators are mounted. When the cutter unit rotates to a specified angle (the system configuration at three different angles are depicted in FIGS. 24-26), one side of the cutter moves toward the guide rails and the other side moves away from the guide rails. This movement can be matched by the guide rails to maintain a minimum gap between the cutter and the rails. Maintaining a minimal gap ensures that only a small portion of the tape section overhangs the guide rails, and prevents the end of the tape section from sagging off the end of the guide rails and hindering the handling of the tape section.

Another variant of the system described includes a carriage system that moves the guide rails not only vertically, but also horizontally along the tape feed direction. This movement allows more precise positioning of the tape relative to the welder heads, and it allows for courses to be placed that are shorter than the distance between the cutter blade and the first welder head. After the cutter cuts a tape section, and the tape is within the guide rails, the carriage moves horizontally away from the cutter and lowers toward the tooling surface to deposit the tape section. Lateral guide rail movement is thus included as an independent concept, though it may also be a feature of the angled cutting system.

In an embodiment of the present invention, either or both of the tooling surface and guide rails move to provide relative displacement with respect to each other. Such movement can be in any direction, such us horizontal, vertical, or combinations thereof, and can include movements such as translational, rotational, or pivotal movements.

As one of ordinary skill in the art would appreciate, the guide rails described herein are only one of many means that could be used for suspending the tape above the tooling surface and positioning the tape once it has been fed and cut. Other methods that use vacuum to suspend the tape above the tooling surface, trays that release the tape by increasing the distance between the guide rails, retractable trays, or other mechanisms may be employed.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for manufacturing a composite preform out of tape material, the method comprising:
    receiving a composite tape section cut and separated from a composite tape supply;
    holding the composite tape section across a tooling surface;
    moving at least one of the composite tape section and the tooling surface to position the composite tape section at a desired location and angle relative to the tooling surface, and near a pre-existing composite tape section disposed on the tooling surface;
    pressing a first portion of the composite tape section to the pre-existing composite tape section; and
    tacking the first portion of the composite tape section to the pre-existing composite tape section, and leaving a second portion of the composite tape section that remains untacked after lay up of the composite preform.

2. The method according to claim 1, wherein holding the composite tape section across the tooling surface comprises using vacuum to hold the composite tape section above the tooling surface.

3. The method according to claim 1, wherein holding the composite tape section across the tooling surface comprises holding the composite tape section in a tray having two or more substantially parallel grooved guide rails positioned relative to each other such that when the composite tape section is fed into the guide rails, opposing longitudinal edges of the composite tape section are held in grooves of the guide rails, with a middle longitudinal portion of the composite tape section unsupported, and wherein the method further comprises releasing the composite tape section by increasing the distance between guide rails of the tray.

4. The method according to claim 1, wherein holding the composite tape section across the tooling surface comprises using a retractable tray.

5. The method according to claim 1, wherein tacking the first portion of the composite tape section comprises simultaneously pressing and tacking multiple isolated locations of the composite tape section in one operation, and wherein a welding tip is used at each of the multiple isolated locations to simultaneously press and tack the each of the multiple isolated locations.

6. The method according to claim 1, wherein tacking the first portion of the composite tape section comprises at least one of contact heating, ultrasonic welding, induction welding, laser heating, and hot gas application.

7. The method according to claim 1, wherein moving at least one of the composite tape section and the tooling surface comprises moving at least one of the tooling surface and an articulating placement head holding the composite tape section.

8. The method according to claim 1, wherein the composite tape section comprises a first composite tape section and the method further comprises:
    simultaneously holding the first composite tape section across the tooling surface in a first placement head and a second composite tape section across the tooling surface in a second placement head;
    simultaneously moving at least one of the first placement head and the tooling surface to position the first composite tape section and at least one of the second placement head and the tooling surface to position the second composite tape section;
    pressing a first portion of the second composite tape section to the pre-existing composite tape section; and
    tacking the first portion of the second composite tape section to the pre-existing composite tape section, and leaving a second portion of the second composite tape section that remains untacked after lay up of the composite preform.

9. The method according to claim 1, further comprising receiving the composite tape section in a tape section guide, wherein the first portion is unsupported by the tape section guide.

10. The method according to claim 1, further comprising receiving the composite tape section in a tape section guide, holding the composite tape section in the tape section guide across the tooling surface, pressing the first portion of the composite tape section through an opening defined by the tape section guide and to the pre-existing composite tape section, tacking the first portion of the composite tape section through the opening defined by the tape section guide and against the pre-existing composite tape section, and moving the tape section guide away from the tooling surface while pressing the first portion to release the composite tape section from the tape section guide.

11. The method according to claim 1, wherein holding the composite tape section comprises holding only the second portion of the composite tape section.

12. The method according to claim 1, further comprising tacking multiple composite tape sections each to a pre-existing composite tape section and after all composite tape sections are tacked, consolidating the composite tape sections together.

13. A method for manufacturing a composite preform out of tape material, the method comprising:
holding a composite tape section across a tooling surface, wherein the composite tape section extends longitudinally from a first free end to a second free end;
moving at least one of the composite tape section and the tooling surface to position the composite tape section at a desired position relative to a pre-existing composite tape section disposed on the tooling surface;
pressing a first portion of the composite tape section to the pre-existing composite tape section; and
tacking the first portion of the composite tape section to the pre-existing composite tape section, and leaving a second portion of the composite tape section that remains untacked after lay up of the composite preform.

14. The method according to claim 13, wherein holding the composite tape section comprises holding the composite tape section in a tape section guide that defines an opening, wherein pressing and tacking the first portion of the composite tape section comprises pressing the first portion through the opening and tacking the first portion to the pre-existing composite tape section, and wherein the method further comprises moving the tape section guide away from the tooling surface while pressing the first portion of the composite tape section to release the composite tape section from the tape section guide.

15. The method according to claim 13, wherein holding the composite tape section comprises holding the composite tape section in a tape section guide comprising two or more substantially parallel grooved rails connected to a carriage and positioned relative to each other such that when the composite tape section is fed into the grooved rails, opposing longitudinal edges of the composite tape section are held in grooves of the grooved rails, with the first portion unsupported by the tape section guide, and
wherein the method further comprises releasing the composite tape section from the tape section guide by at least one of: (i) pressing the composite tape section while moving the tape section guide away from the tooling surface, and (ii) increasing the distance between the grooved rails.

16. The method according to claim 13, wherein holding the composite tape section across the tooling surface comprises using vacuum to hold the composite tape section above the tooling surface.

17. The method according to claim 13, wherein holding the composite tape section comprises holding the composite tape section at a position generally parallel to the tooling surface with the first end and the second end generally equidistant from the tooling surface,
wherein while moving the at least one of the composite tape section and the tooling surface, the composite tape section is maintained generally parallel to the tooling surface, and
wherein the desired position is one of near the pre-existing composite tape section and in contact with the pre-existing composite tape section.

18. The method according to claim 13, wherein the first free end and the second free end of the composite tape section are maintained substantially equidistant from the pre-existing composite tape section as the composite tape section is moved into position for pressing and tacking of the first portion of the composite tape section.

19. A method for manufacturing a composite preform out of tape material, the method comprising:
holding a composite tape section across a tooling surface, wherein the composite tape section extends longitudinally from a first free end to a second free end;
moving at least one of the composite tape section and the tooling surface to position the first free end and the second free end of the composite tape section at desired positions relative to a pre-existing composite tape section disposed on the tooling surface;
pressing a portion of the composite tape section to the pre-existing composite tape section; and
tacking the portion of the composite tape section to the pre-existing composite tape section, and leaving a remainder of the composite tape section that remains untacked after the composite preform is complete and until consolidation of the complete composite preform.

20. The method according to claim 19, wherein pressing and tacking the portion of the composite tape section comprises simultaneously pressing and tacking in one operation multiple isolated locations of the portion of the composite tape section in a direction longitudinally along the composite tape section from the first free end to the second free end, and wherein a welding tip is used at each of the multiple isolated locations to simultaneously press and tack the each of the multiple isolated locations.

21. The method according to claim 19, wherein holding the composite tape section comprises holding the composite tape section by one of a vacuum placement head and a tape section guide that defines an opening through which the composite tape section may be pressed and tacked.

22. The method according to claim 1, wherein in pressing the first portion of the composite tape section to the pre-existing composite tape section, the second portion of the composite tape section remains unpressed through completion of lay up of the composite tape section.

23. The method according to claim 13, wherein in pressing the first portion of the composite tape section to the pre-existing composite tape section, the second portion of the composite tape section remains unpressed through completion of lay up of the composite tape section.

24. The method according to claim 19, wherein pressing the portion of the composite tape section to the pre-existing composite tape section comprises pressing the portion of the composite tape section to the pre-existing composite tape section, and leaving the remainder of the composite tape section unpressed through completion of lay up of the composite tape section.

25. The method according to claim 1, further comprising pressing a portion of the second portion of the composite tape section with a pressure foot while tacking the first portion of the composite tape section.

* * * * *